United States Patent
Yang et al.

(10) Patent No.: US 12,206,618 B2
(45) Date of Patent: Jan. 21, 2025

(54) RESOURCE BLOCK DETERMINATION FOR CONTROL CHANNEL REPETITIONS

(71) Applicant: QUALCOMM Incorporated, San Diego, CA (US)

(72) Inventors: Wei Yang, San Diego, CA (US); Yi Huang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/483,612

(22) Filed: Sep. 23, 2021

(65) Prior Publication Data

US 2022/0103328 A1  Mar. 31, 2022

Related U.S. Application Data

(60) Provisional application No. 63/084,471, filed on Sep. 28, 2020.

(51) Int. Cl.
  *H04L 5/00* (2006.01)
  *H04L 1/18* (2023.01)
  *H04W 72/21* (2023.01)

(52) U.S. Cl.
  CPC .............. *H04L 5/0053* (2013.01); *H04L 1/18* (2013.01); *H04W 72/21* (2023.01); *H04L 5/0094* (2013.01)

(58) Field of Classification Search
  CPC ....... H04L 5/0053; H04L 1/18; H04L 1/1864; H04L 1/189; H04L 1/1893; H04L 5/0051; H04L 5/0094; H04W 72/21; H04W 72/0446
  See application file for complete search history.

(56) References Cited

U.S. PATENT DOCUMENTS

| | | | | |
|---|---|---|---|---|
| 11,071,120 | B2* | 7/2021 | Harada | H04L 5/0078 |
| 2010/0067461 | A1* | 3/2010 | Kwak | H04L 5/006 |
| | | | | 370/329 |
| 2013/0128854 | A1* | 5/2013 | Nakashima | H04L 5/0048 |
| | | | | 370/329 |
| 2018/0302916 | A1* | 10/2018 | Lee | H04L 5/0012 |
| 2019/0013982 | A1* | 1/2019 | Sun | H04W 72/20 |
| 2019/0313342 | A1* | 10/2019 | Papasakellariou | H04W 52/48 |
| 2019/0373613 | A1* | 12/2019 | Harada | H04L 5/0005 |
| 2020/0044800 | A1* | 2/2020 | Takeda | H04L 5/0053 |
| 2020/0163112 | A1* | 5/2020 | Lee | H04L 5/00 |

(Continued)

*Primary Examiner* — Oussama Roudani
(74) *Attorney, Agent, or Firm* — Holland & Hart LLP

(57) ABSTRACT

Methods, systems, and devices for wireless communications are described. A user equipment (UE) may communicate with a base station as part of a wireless communications system. The UE may identify a configuration for one or more repetitions of an uplink control channel transmission, where each repetition of the one or more repetitions including a first quantity of symbols indicated by the configuration. The UE may determine a quantity of resource blocks for each repetition of the one or more repetitions. The UE may then identify that a second quantity of symbols is available to the UE to transmit a repetition of the one or more repetitions, and the second quantity of symbols may be less than the first quantity of symbols. The UE may transmit, to a base station, the repetition on the second quantity of symbols using the quantity of resource blocks for each repetition with the first quantity of symbols.

30 Claims, 16 Drawing Sheets

(56) References Cited

U.S. PATENT DOCUMENTS

| | | | |
|---|---|---|---|
| 2021/0329622 A1* | 10/2021 | Yin | H04L 1/1861 |
| 2022/0210862 A1* | 6/2022 | Cirik | H04L 5/0055 |
| 2023/0087223 A1* | 3/2023 | Jang | H04L 1/1896 |
| | | | 370/329 |

* cited by examiner

US 12,206,618 B2

RESOURCE BLOCK DETERMINATION FOR CONTROL CHANNEL REPETITIONS

CROSS REFERENCE

The present Application for patent claims the benefit of U.S. Provisional Patent Application No. 63/084,471 by YANG et al., entitled "RESOURCE BLOCK DETERMINATION FOR CONTROL CHANNEL REPETITIONS," filed Sep. 28, 2020, assigned to the assignee hereof, and expressly incorporated by reference herein.

TECHNICAL FIELD

The following relates to wireless communications, including resource block determination for control channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may transmit uplink control channel repetitions to a base station in a wireless communication system. The UE may determine configuration information about the repetitions, including scheduling information. In some cases, one or more repetitions of the uplink control channel transmission may cross a slot boundary, or overlap with a downlink symbol, which may cause interference or disruptions with reception of the uplink control channel repetition by the base station.

SUMMARY

The described techniques relate to improved methods, systems, devices, and apparatuses that support resource block determination for control channel repetitions. Generally, the described techniques provide for a user equipment (UE) transmitting uplink control channel repetitions to a base station. The UE may identify a configuration for one or more repetitions of an uplink control channel (e.g., a physical uplink control channel (PUCCH)) transmission, the configuration indicating a first quantity of repetitions of the one or more repetitions, and each repetition of the one or more repetitions including a first quantity of symbols indicated by the configuration. The UE may determine a quantity of resource blocks for each repetition of the one or more repetitions, based on the first quantity of symbols. The UE may then identify that a second quantity of symbols is available to the UE to transmit a repetition of the one or more repetitions, and the second quantity of symbols may be less than the first quantity of symbols. The UE may determine to use the quantity of resource blocks, and the UE may transmit, to a base station, the repetition on the second quantity of symbols on the quantity of resource blocks.

A method of wireless communications at a UE is described. The method may include identifying a configuration for one or more repetitions of an uplink control channel transmission, the configuration indicating a first quantity of repetitions of the one or more repetitions, and each repetition of the one or more repetitions including a first quantity of symbols indicated by the configuration, determining a quantity of resource blocks for each repetition of the one or more repetitions based on the first quantity of symbols, identifying that a second quantity of symbols available to the UE to transmit a repetition of the one or more repetitions is less than the first quantity of symbols, determining, for the repetition on the second quantity of symbols, to use the quantity of resource blocks determined based at least in part on the first quantity of symbols for the repetition on the second quantity of symbols, and transmitting, to a base station, the repetition on the second quantity of symbols on the quantity of resource blocks associated with the first quantity of symbols.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to identify a configuration for one or more repetitions of an uplink control channel transmission, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols indicated by the configuration, identify that a second quantity of symbols available to the UE to transmit a repetition of the one or more repetitions is less than the first quantity of symbols, determine, for the repetition on the second quantity of symbols, to use the quantity of resource blocks determined based at least in part on the first quantity of symbols for the repetition on the second quantity of symbols, and transmit, to a base station, the repetition on the second quantity of symbols on the quantity of resource blocks associated with the first quantity of symbols.

Another apparatus for wireless communications at a UE is described. The apparatus may include means for identifying a configuration for one or more repetitions of an uplink control channel transmission, the configuration indicating a first quantity of repetitions of the one or more repetitions, and each repetition of the one or more repetitions including a first quantity of symbols indicated by the configuration, determining a quantity of resource blocks for each repetition of the one or more repetitions based on the first quantity of symbols, identifying that a second quantity of symbols available to the UE to transmit a repetition of the one or more repetitions is less than the first quantity of symbols, determining, for the repetition on the second quantity of symbols, to use the quantity of resource blocks determined based at least in part on the first quantity of symbols for the repetition on the second quantity of symbols, and transmitting, to a base station, the repetition on the second quantity of symbols on the quantity of resource blocks associated with the first quantity of symbols.

A non-transitory computer-readable medium storing code for wireless communications at a UE is described. The code may include instructions executable by at least one processor to identify a configuration for one or more repetitions of an uplink control channel transmission, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine to use the quantity of resource blocks associated with the first quantity of symbols for the repetition on the second quantity of symbols, and transmit, to a base station, the repetition on the second quantity of symbols on the quantity of resource blocks associated with the first quantity of symbols.

Some examples of the method, apparatuses, and non-transitory computer-readable medium described herein may further include operations, features, means, or instructions for determining, for the repetition, that one or more symbols of the first quantity of symbols may have been configured by the base station for downlink transmissions, the second quantity of symbols for the repetition excluding the one or more symbols that may have been configured for the downlink transmissions.

Some examples of the method, apparatuses, and non-transitory computer-readable medium described herein may further include operations, features, means, or instructions for determining, for a first repetition of the one or more repetitions, that the first repetition crosses a slot boundary, and splitting the first repetition to generate the repetition associated with the identified second quantity of symbols, and zero or more additional repetitions.

Some examples of the method, apparatuses, and non-transitory computer-readable medium described herein may further include operations, features, means, or instructions for receiving, from the base station, an indication for the UE to use one of a set of uplink control channel repetition types, and determining the quantity of resource blocks further based on the received indication.

Some examples of the method, apparatuses, and non-transitory computer-readable medium described herein may further include operations, features, means, or instructions for determining a quantity of demodulation reference signal symbols associated with the first quantity of symbols, where the determining the quantity of resource blocks may be further based on the determined quantity of demodulation reference signal symbols.

Some examples of the method, apparatuses, and non-transitory computer-readable medium described herein may further include operations, features, means, or instructions for determining the quantity of demodulation reference signal symbols may be based on an assumption of an absence of the configuration to perform intra-repetition hopping.

Some examples of the method, apparatuses, and non-transitory computer-readable medium described herein may further include operations, features, means, or instructions for determining, from a set of sets of uplink control channel resources, a set of uplink control channel resources on which to transmit the uplink control channel transmission, where the quantity of resource blocks for the repetition may be based at least in part on the determined set of uplink control channel resources.

Some examples of the method, apparatuses, and non-transitory computer-readable medium described herein may further include operations, features, means, or instructions for determining, from a set of uplink control channel formats, an uplink control channel format to use to transmit the uplink control channel transmission, where the quantity of resource blocks for the repetition may be based at least in part on the determined uplink control channel format.

In some examples of the method, apparatuses, and non-transitory computer-readable medium described herein, the uplink control channel format may be a physical uplink control channel format two or a physical uplink control channel format three.

Some examples of the method, apparatuses, and non-transitory computer-readable medium described herein may further include operations, features, means, or instructions for determining the quantity of resource blocks for the uplink control channel transmission based on the first quantity of symbols and a first set of values for a payload size, a code rate, and a modulation order for the uplink control channel transmission.

Some examples of the method, apparatuses, and non-transitory computer-readable medium described herein may further include operations, features, means, or instructions for receiving, from the base station, the configuration indicating the first quantity of repetitions and the first quantity of symbols, and determining the quantity of resource blocks based on the first quantity of repetitions and the first quantity of symbols.

In some examples of the method, apparatuses, and non-transitory computer-readable medium described herein, the configuration includes radio resource control (RRC) signaling indicating the first quantity of repetitions and the first quantity of symbols.

Some examples of the method, apparatuses, and non-transitory computer-readable medium described herein may further include operations, features, means, or instructions for transmitting, to the base station, a remaining one or more repetitions of the set of repetitions on the first quantity of symbols using the quantity of resource blocks.

A method of wireless communications at a base station is described. The method may include identifying a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration, determining a quantity of resource blocks for each repetition of the one or more repetitions based on the first quantity of symbols, identifying that a second quantity of symbols available to the UE to transmit a repetition of the one or more repetitions is less than the first quantity of symbols, determining, for the repetition on the second quantity of symbols, to use the quantity of resource blocks determined based at least in part on the first quantity of symbols for the repetition on the second quantity of symbols, and receiving, from the UE, the repetition on the second quantity of symbols on the quantity of resource blocks.

An apparatus for wireless communications at a base station is described. The apparatus may include at least one processor, memory coupled (e.g., operatively, communicatively, functionally, electronically, or electrically) to the at least one processor, and instructions stored in the memory.

The instructions may be executable by the at least one processor to cause the apparatus to identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine, for the repetition on the second quantity of symbols, to use the quantity of resource blocks determined based at least in part on the first quantity of symbols for the repetition on the second quantity of symbols, and receive, from the UE, the repetition on the second quantity of symbols on the quantity of resource blocks.

Another apparatus for wireless communications at a base station is described. The apparatus may include means for identifying a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration, determining a quantity of resource blocks for each repetition of the one or more repetitions based on the first quantity of symbols, identifying that a second quantity of symbols available to the UE to transmit a repetition of the one or more repetitions is less than the first quantity of symbols, determining, for the repetition on the second quantity of symbols, to use the quantity of resource blocks determined based at least in part on the first quantity of symbols for the repetition on the second quantity of symbols, and receiving, from the UE, the repetition on the second quantity of symbols on the quantity of resource blocks.

A non-transitory computer-readable medium storing code for wireless communications at a base station is described. The code may include instructions executable by at least one processor to identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine, for the repetition on the second quantity of symbols, to use the quantity of resource blocks determined based at least in part on the first quantity of symbols for the repetition on the second quantity of symbols, and receive, from the UE, the repetition on the second quantity of symbols on the quantity of resource blocks.

Some examples of the method, apparatuses, and non-transitory computer-readable medium described herein may further include operations, features, means, or instructions for determining, for the repetition, that one or more symbols of the first quantity of symbols may have been configured for downlink transmissions, the second quantity of symbols for the repetition excluding the one or more symbols that may have been configured for the downlink transmissions.

Some examples of the method, apparatuses, and non-transitory computer-readable medium described herein may further include operations, features, means, or instructions for determining, for a first repetition of the one or more repetitions, that the first repetition crosses a slot boundary, and splitting the first repetition to generate the repetition associated with the identified second quantity of symbols, and zero or more additional repetitions.

Some examples of the method, apparatuses, and non-transitory computer-readable medium described herein may further include operations, features, means, or instructions for transmitting, to the UE, an indication that the UE may be to use one of a set of uplink control channel repetition types, and determining the quantity of resource blocks further based on the transmitted indication.

Some examples of the method, apparatuses, and non-transitory computer-readable medium described herein may further include operations, features, means, or instructions for determining a quantity of demodulation reference signal symbols associated with the first quantity of symbols, where the determining the quantity of resource blocks may be further based on the determined quantity of demodulation reference signal symbols.

Some examples of the method, apparatuses, and non-transitory computer-readable medium described herein may further include operations, features, means, or instructions for determining the quantity of demodulation reference signal symbols may be based on an assumption of an absence of the configuration to perform intra-repetition hopping.

Some examples of the method, apparatuses, and non-transitory computer-readable medium described herein may further include operations, features, means, or instructions for determining, from a set of sets of uplink control channel resources, a set of uplink control channel resources on which to transmit the uplink control channel transmission, where the quantity of resource blocks for the repetition may be based at least in part on the determined set of uplink control channel resources.

Some examples of the method, apparatuses, and non-transitory computer-readable medium described herein may further include operations, features, means, or instructions for determining, from a set of uplink control channel formats, an uplink control channel format to use to transmit the uplink control channel transmission, where the quantity of resource blocks for the repetition may be based at least in part on the determined uplink control channel format.

Some examples of the method, apparatuses, and non-transitory computer-readable medium described herein may further include operations, features, means, or instructions for determining the quantity of resource blocks for the uplink control channel transmission based on the first quantity of symbols and a first set of values for a payload size, a code rate, and a modulation order for the uplink control channel transmission.

Some examples of the method, apparatuses, and non-transitory computer-readable medium described herein may further include operations, features, means, or instructions for transmitting, to the UE, the configuration indicating the first quantity of repetitions and the first quantity of symbols, and determining the quantity of resource blocks based on the first quantity of repetitions and the first quantity of symbols.

In some examples of the method, apparatuses, and non-transitory computer-readable medium described herein, the configuration includes RRC signaling including a semi-persistent configuration indicating the first quantity of repetitions and the first quantity of symbols.

Some examples of the method, apparatuses, and non-transitory computer-readable medium described herein may further include operations, features, means, or instructions for receiving, from the UE, a remaining one or more repetitions of the set of repetitions on the first quantity of symbols using the quantity of resource blocks.

DETAILED DESCRIPTION

Figure 1:
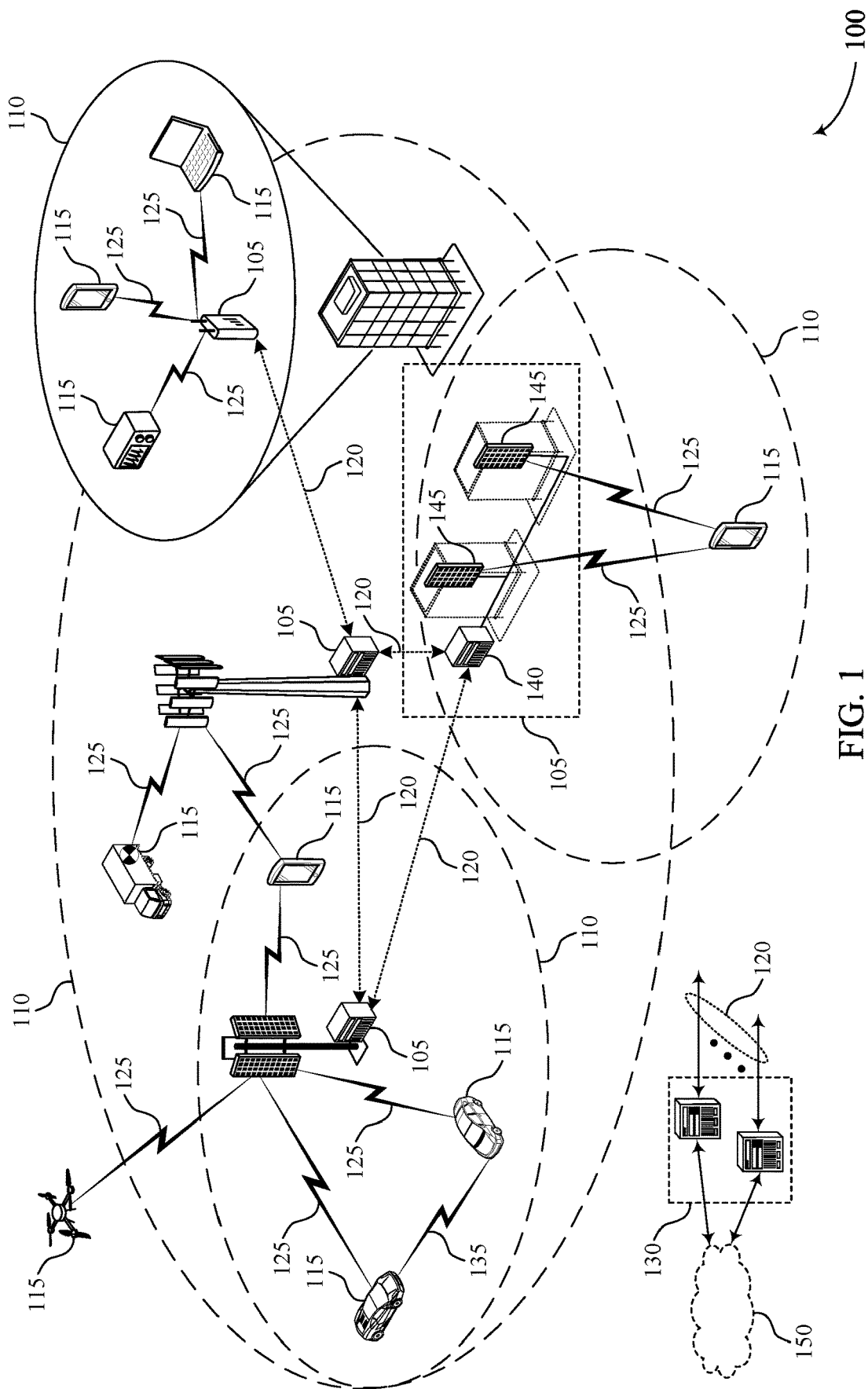
FIG. 1 illustrates an example of a wireless communications system that supports resource block determination for control channel repetitions in accordance with aspects of the present disclosure.

A user equipment (UE) may communicate with a base station in a wireless communications system. The base station may transmit downlink communications to the UE, and the UE may transmit uplink communications to the base station. The downlink and uplink transmissions may include data and control transmissions. For example, the UE may transmit uplink control transmissions in a physical uplink control channel (PUCCH) transmission. The UE may transmit a PUCCH transmission, such as uplink control information (UCI) on a PUCCH, to a base station using a configured PUCCH scheme (e.g., according to a PUCCH type or format).

The PUCCH scheme may include a configuration to use a number of resource blocks (RBs) (or physical resource blocks (PRBs)), a number of symbols, a starting symbol index, and a maximum code rate. A UE may also be configured to transmit such PUCCH transmission using repetition, which may be referred to as PUCCH repetition. A PUCCH repetition transmission may include the UE transmitting the same PUCCH transmission multiple times, but on different physical resources. In some cases, PUCCH repetition may include a single repetition of the PUCCH transmission, while in other cases, PUCCH repetition may include multiple instances of the same PUCCH transmission. For example, the different physical resources may be multiplexed in time. For PUCCH repetition transmissions, the UE may determine a number of resource blocks for the transmission based on the number of symbols of the transmission itself. However, in some cases, different amounts of resources may be available to different instances of repetition of the PUCCH transmission. For example, the length (e.g., number of symbols or other time domain denomination) available for one instance of a repetition may be impacted for a subsequent transmission, such as in cases where the repetition crosses a slot boundary, or symbols of the repetition conflict with symbols configured for downlink transmissions (e.g., in the case of a time division repetition scheme). A repetition instance of a PUCCH transmission that crosses the slot boundary or interferes with a configured downlink symbol may affect the ability of the base station to successfully receive the PUCCH transmission from a UE, and successfully decode the PUCCH transmission that is repeated.

To improve reception and decoding of the PUCCH transmission at the base station, the UE may identify a configured (e.g., nominal, baseline, first) number of symbols for each repetition of the PUCCH transmission repetitions, and a configured number of repetitions. The UE may identify that one or more of the repetitions have a different number of symbols. For example, the UE may identify that one or more of the configured repetitions may cross a slot boundary, or interfere with a downlink symbol configured by the base station (e.g., an RRC configured downlink symbol (which may also be referred to as a semi-statically configured downlink symbol)). The UE may split the identified repetition occasion into one or more actual (e.g., modified, revised, updated, second) PUCCH repetitions, for example two repetitions where a slot boundary is crossed, or a single, shorter repetition where some symbols are previously allocated for downlink transmissions. The UE may use the actual PUCCH repetition occasions to transmit a PUCCH transmission to the base station. The UE may then use the configured quantity of symbols for the repetition to calculate the actual quantity of resource blocks to use to transmit the uplink PUCCH transmission. The UE may transmit the repetition on the quantity of symbols using the configured quantity of resource blocks. The UE may also determine a PUCCH repetition type or scheme to use to transmit the PUCCH repetitions, and the UE may determine the configured quantity of resource blocks based on the PUCCH repetition type.

In other cases, the UE may also determine a quantity of demodulation reference signal (DMRS) symbols associated with the first quantity of symbols. For example, the UE may derive a number of symbols with DMRSs, and the UE may calculate the number of resources blocks based on the number of symbols that are included in the configured repetition. The code rate, modulation order, and payload may remain the same for each repetition of the PUCCH transmission to facilitate successful decoding at the base station.

Aspects of the disclosure are initially described in the context of wireless communications systems. Aspects of the disclosure are then described with respect a slot diagram and a process flow. Aspects of the disclosure are further illustrated by and described with reference to apparatus diagrams, system diagrams, and flowcharts that relate to resource block determination for control channel repetitions.

FIG. 1 illustrates an example of a wireless communications system 100 that supports resource block determination for control channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, which may be implemented in various articles such as appliances, drones, robots, vehicles, or meters.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), and NB-IoT may include eNB-IoT (enhanced NB-IoT), FeNB-IoT (further enhanced NB-IoT).

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., eMTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UE may identify a configuration for one or more repetitions of an uplink control channel (e.g., a PUCCH) transmission, the configuration indicating a first quantity of repetitions of the one or more repetitions, and each repetition of the one or more repetitions including a first quantity of symbols indicated by the configuration. The UE may determine a quantity of resource blocks for each repetition of the one or more repetitions, based on the first quantity of symbols. The UE may then identify that a second quantity of symbols is available to the UE to transmit a repetition of the one or more repetitions, and the second quantity of symbols may be less than the first quantity of symbols. The UE may determine, for the repetition on the second quantity of symbols, to use the quantity of resource blocks determined based on the first quantity of symbols, and the UE may transmit, to a base station, the repetition on the second quantity of symbols on the quantity of resource blocks.

Figure 2:
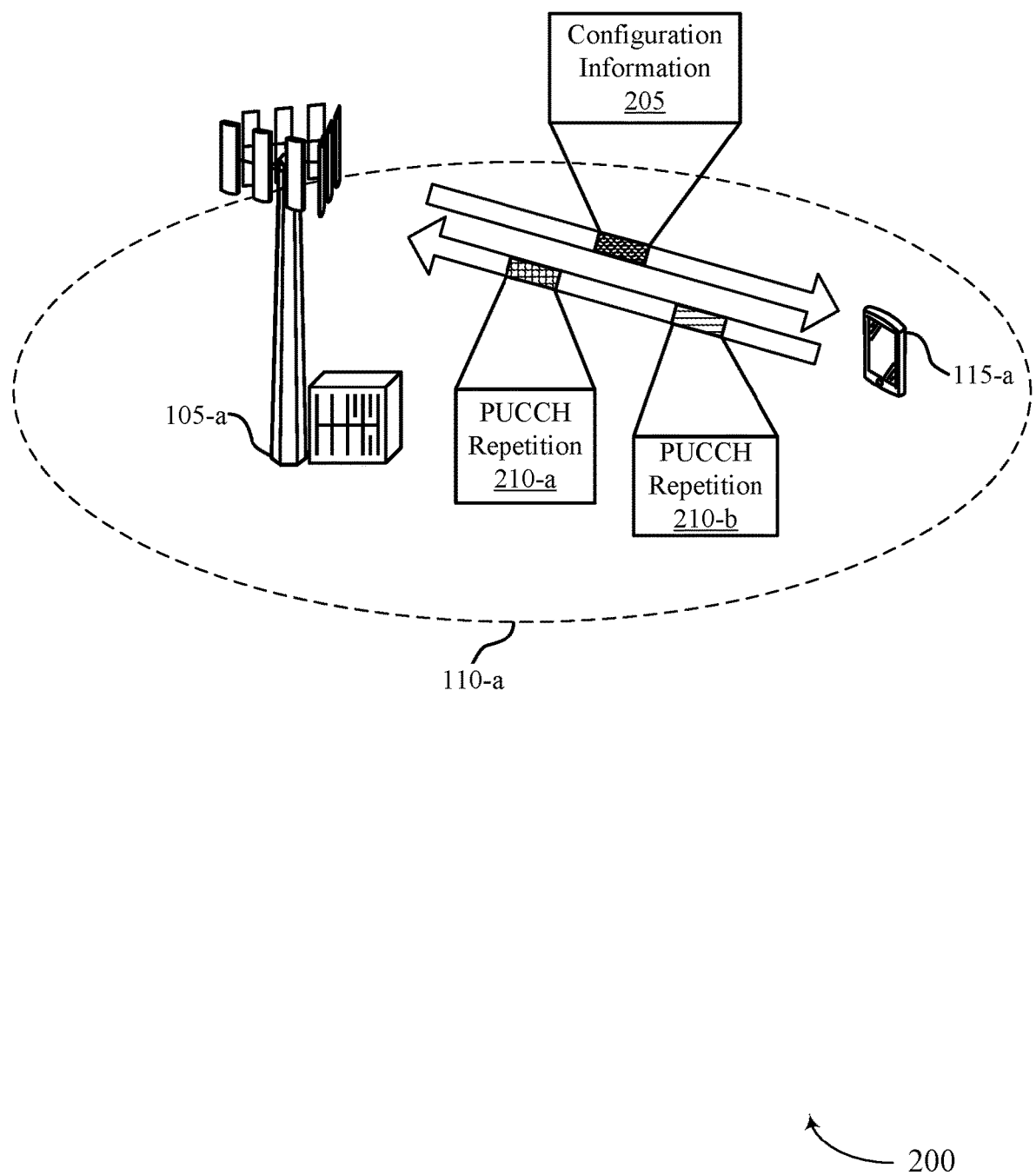
FIG. 2 illustrates an example of a wireless communications system that supports resource block determination for control channel repetitions in accordance with aspects of the present disclosure.

FIG. 2 illustrates an example of a wireless communications system 200 that supports resource block determination for control channel repetitions in accordance with aspects of the present disclosure. In some examples, wireless communications system 200 may implement aspects of wireless communications system 100. UE 115-a may be an example of a UE 115 as described with respect to FIG. 1. Base station 105-a may be an example of a base station 105 as described with respect to FIG. 1. Base station 105-a may serve UEs 115, including UE 115-a, within a coverage area 110-a. Base station 105-a may transmit messages to UE 115-a over downlink communication link 125-a. UE 115-a may receive messages from base station 105-a over downlink communication link 125-a. UE 115-a may communicate with base station 105-a by transmitting messages over uplink communications link 125-b. Base station 105-a may receive these messages over the uplink communications link 125-b. In some examples, such as those described by the present disclosure, wireless communications system 200 may support a PUCCH repetition configuration.

For example, UE 115-a may transmit PUCCH transmissions to base station 105-a. In some cases, the PUCCH transmission may be PUCCH repetitions 210. UE 115-a may transmit PUCCH repetitions 210 based on receiving a grant from base station 105-a, such as downlink control information (DCI) scheduling the PUCCH repetitions 210. PUCCH repetitions 210 may be examples of UCI transmissions. UE 115-a may receive configuration information 205, which may include the DCI and grant, or scheduling information for PUCCH repetitions 210.

A UCI transmission may correspond to payload of size K, where K is a number of bits. K may include a number of CRC bits. Based on identifying the payload of size K (e.g., based on receiving configuration information 205 from base station 105-a), UE 115-a may determine a minimum number of resource blocks for the PUCCH repetition 210. For example, UE 115-a may determine a set of configured resource blocks for PUCCH repetition 210-a, and a second set of resource blocks for PUCCH repetition 210-b. UE 115-a may determine a nominal number of resource blocks for a PUCCH repetition 210 based on a set of equations. For example, the minimum number of resource blocks may be such that $M_{RB,min}^{PUCCH} \leq M_{RB}^{PUCCH}$, where $K \leq M_{RB,min}^{PUCCH} \cdot N_{symb-UCI}^{PUCCH} \cdot Q_m \cdot N_{sc,ctrl}^{RB} \cdot r$, and where $N_{symb-UCI}^{PUCCH}$ indicates a number of symbols for a PUCCH format (e.g., PUCCH format 2) and a number of non-DMRS OFDM symbols for another PUCCH format (e.g., PUCCH format 3). In some cases, $Q_m=1$ for a pi/2 binary phase shift keying configuration and $Q_m=2$ for a quadrature phase shift keying configuration.

Figure 3:
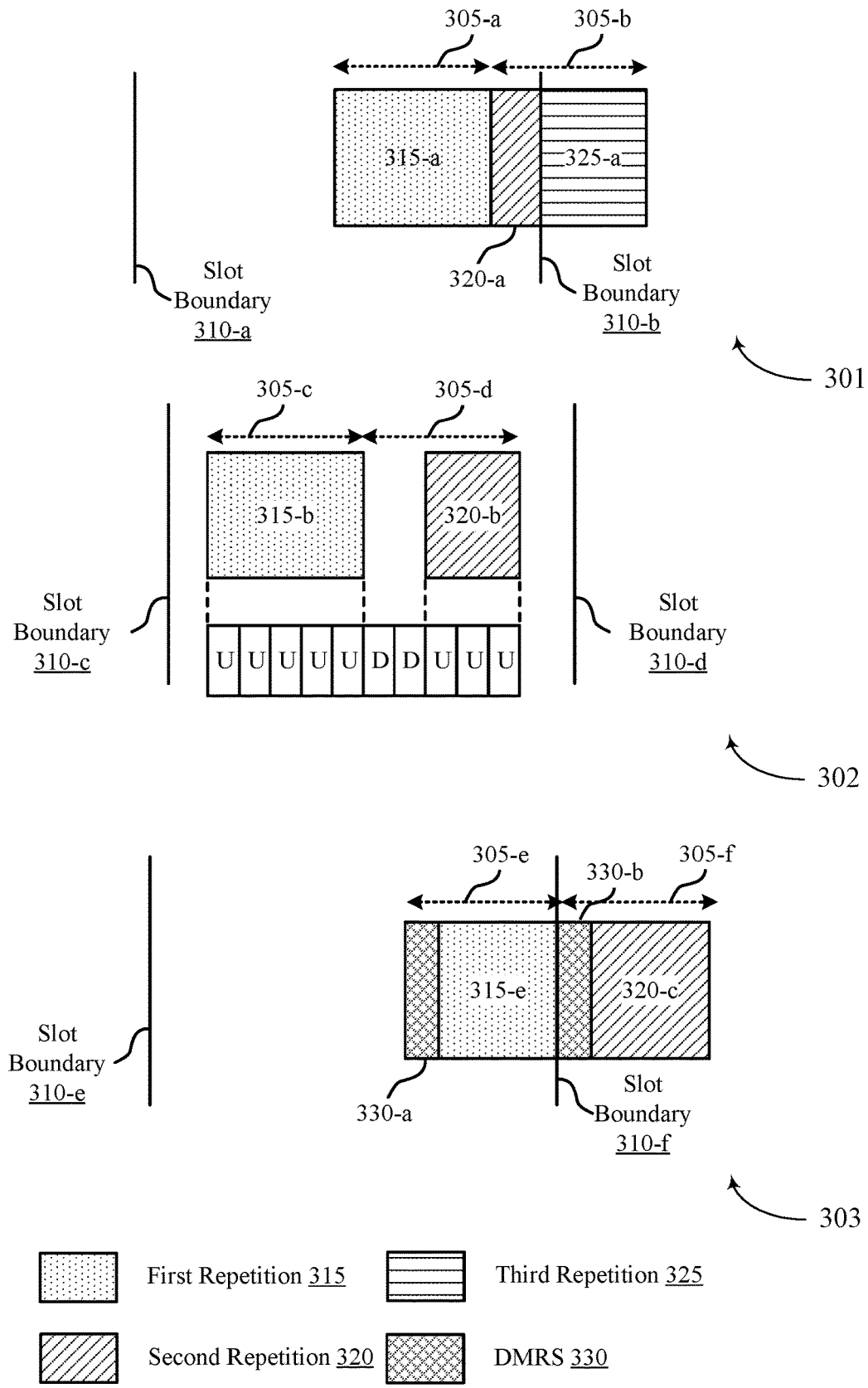
FIG. 3 illustrates an example of slot diagrams that supports resource block determination for control channel repetitions in accordance with aspects of the present disclosure.

In some examples, one or more PUCCH repetitions 210 may be scheduled or configured within a slot or across slot boundaries (e.g., as described in further detail with respect to FIG. 3). In some examples, symbols identified for a PUCCH repetition may overlap with symbols scheduled for downlink transmissions from base station 105-*a* (e.g., in the case of time division multiplexing). In either of these cases, the base station 105-*a* may not be able to accurately receive and decode the PUCCH repetition 210. In such cases, UE 115-*a* may determine a different set of symbols to use for a PUCCH repetition 210, such that the symbol either do not cross a slot boundary, does not interfere with a downlink symbol, or both.

For example, UE 115-*a* may identify a first quantity of resource blocks for repetition 210-*a*, and a configured quantity of symbols of repetition 210-*a*. UE 115-*a* may determine these quantities based on the received configuration information 205 (e.g., a DCI) from base station 105-*a*. UE 115-*a* may also identify the configuration information without signaling from base station 105-*a*. UE 115-*a* may also identify a first quantity of resource blocks for repetition 210-*b*, and a configured quantity of symbols of repetition 210-*b*. UE 115-*a* may determine these quantities based on the received configuration information 205 (e.g., a DCI) from base station 105-*a*. UE 115-*a* may determine that the configured (e.g., a nominal) PUCCH repetition 210-*b* crosses a slot boundary. For example, UE 115-*a* may identify that a second quantity of symbols are available to UE 115-*a* to transmit repetition 210-*b* (e.g., because the PUCCH repetition 210-*b* crosses the slot boundary). The UE 115-*a* may determine, for a repetition on the second quantity of symbols, to use the quantity of resource blocks for each repetition based on the first quantity of symbols. For example, UE 115-*a* may split PUCCH repetition 210-*b* into one or more actual PUCCH repetitions 210, for transmitting second PUCCH repetition 210-*b* and a third PUCCH repetition 210. UE 115-*a* may then transmit the PUCCH repetitions 210-*a*, 210-*b*, and the third PUCCH repetition 210 to base station 105-*a* using the second quantity of symbols, that may be less that the originally scheduled first quantity of symbols.

In another example, UE 115-*a* may identify that configured PUCCH repetition 210-*b* includes symbols that are scheduled to overlap with configured downlink symbols. In such cases, UE 115-*a* may determine that the UE 115-*a* has a second set of symbols available for transmission of PUCCH repetition 210-*b*, where the second set of symbols is based on the first set of configured symbols and may be less than the first set of configured symbols. For example, the symbols of the configured PUCCH repetition 210-*b* that overlap with the downlink symbols may not be usable by UE 115-*a* for transmission to base station 105-*a*. As such, UE 115-*a* may use the second set of symbols for transmission of PUCCH repetition 210-*b* to base station 105-*a*.

Further, for each PUCCH transmission resource, UE 115-*a* may be configured with an indication of whether to apply a first PUCCH repetition type (e.g., a PUCCH repetition type A) to the transmission of PUCCH repetitions 210, or a second PUCCH repetition type (e.g., a PUCCH repetition type B). UE 115-*a* may be configured with the indication based on receiving configuration information 205 from base station 105-*a*. UE 115-*a* may further determine the resource blocks (e.g., frequency resources) to use for the transmission of PUCCH repetitions 210 based on the PUCCH repetition types (e.g., the first set of configured symbols). UE 115-*a* may also determine a PUCCH format (e.g., PUCCH format 2 or PUCCH format 3) to use for transmission of PUCCH repetitions 210. In some cases, UE 115-*a* may determine the number of resource blocks to use for transmission of PUCCH repetitions 210 based on the PUCCH format. For example, UE 115-*a* may use the same number of resource blocks for transmission of all PUCCH repetitions 210. UE 115-*a* may determine the PUCCH format based on the configuration information 205.

For example, UE 115-*a* may determine to transmit PUCCH repetitions 210 based on a first PUCCH format (e.g., PUCCH format 3). In this case, UE 115-*a* may use a number of DMRS symbols to determine the number of resource blocks to use for the PUCCH repetitions. In this case, the number of DMRS symbols may be based on the number of DMRS symbols (e.g., according to the PUCCH format) in the configured nominal PUCCH repetition, instead of basing the number of DMRS symbols on a shortened PUCCH repetition (e.g., based on the PUCCH repetition 210 crossing the slot boundary or interfering with a downlink symbol). Further, UE 115-*a* may determine the number of DMRS symbols in the nominal PUCCH repetition 210 based on UE 115-*a* not performing intra-repetition hopping. In this case, UE 115-*a* may perform one hop per nominal repetition.

FIG. 3 illustrates an example of slot diagrams 301, 302, and 303 that supports resource block determination for control channel repetitions in accordance with aspects of the present disclosure. In some examples, slot diagrams 301, 302, and 303 may implement aspects of wireless communications systems 100 and 200. A UE 115 may transmit communications according to the configurations described in slot diagrams 301, 302, and 303.

Slot diagram 301 illustrates an example of a scheduled PUCCH repetition that crosses a slot boundary. A slot in 301 may be defined by slot boundaries 310-*a* and 310-*b*. A UE 115 may receive configuration information from a base station, where the configuration information indicates scheduling information for a set of transmissions of PUCCH repetitions 305. One or more of the PUCCH repetitions 305 may cross a slot boundary. For example, a first scheduled nominal transmission of a PUCCH repetition 305-*a* may not cross a slot boundary. Nominal PUCCH repetition 305-*a* may be scheduled for a set of symbols on a set of resource blocks. UE 115-*a* may transmit first repetition 315-*a* as scheduled. Nominal PUCCH repetition 305-*b* may also be scheduled for a set of symbols of a set of resource blocks. However, nominal PUCCH repetition 305-*b* may cross slot boundary 310-*b*. In this case, the UE 115 may identify that fewer symbols are available for transmission of PUCCH repetition 305-*b*. The UE 115 may split PUCCH repetition 305-*b* into two PUCCH repetitions, second repetition 320-*a*, and third repetition 325-*a*. In this case, UE 115 may determine a number of resource blocks for transmission for both nominal PUCCH repetitions 305-*a* and 305-*b*. The UE 115 may then transmit the three repetitions 315-*a*, 320-*a*, and 325-*a* within the resource blocks scheduled for PUCCH repetition 305-*a*.

Slot diagram 302 illustrates an example of a scheduled PUCCH repetition that overlaps with a scheduled downlink symbol. A slot in 302 may be defined by slot boundaries 310-*c* and 310-*d*. A UE 115 may receive configuration information from a base station, where the configuration information indicates scheduling information for a set of transmissions of PUCCH repetitions 305. One or more PUCCH repetitions 305 may overlap with a downlink symbol, which may cause interference. For example, a first scheduled or nominal transmission of a PUCCH repetition 305-*c* may be scheduled to occur over a set of uplink symbols. PUCCH repetition 305-*c* may be scheduled for a set of symbols on a set of resource blocks. PUCCH repetition 305-*d* may also be scheduled for a same number of symbols of a same number of resource blocks. However, PUCCH repetition 305-*d* may be scheduled to overlap with a set of downlink symbols. In this case, the UE 115 may identify that fewer symbols are available for transmission of nominal or configured PUCCH repetition 305-*d*, as some of the configured, or nominal, symbols of scheduled PUCCH repetition 305-*d* overlap with downlink symbols. The UE 115 may thus transmit second repetition 320-*b* on a shorter number of symbols than first repetitions 315-*b* based on the first repetitions 315-*b*. Second repetition 320-*b* may therefore not interfere with downlink symbols, and may be received and decoded at a base station 105. Although the number of symbols for first repetition 315-*b* and second repetition 320-*b* may be different, the UE 115 may use the same number of resource blocks in frequency to transmit first repetition 315-*b* and second repetition 320-*b*. Thus, UE 115 may use the same bandwidth to transmit first repetition 315-*b* and second repetition 320-*b*.

In slot diagram 303, a UE 115 may identify scheduled PUCCH repetitions 305-*e* and 305-*f*. The UE 115 may determine a number of resource blocks for PUCCH repetition 305 transmission based on a nominal number of OFDM symbols for the PUCCH resource, and based on a configured PUCCH format. The PUCCH format may be received in the configuration information from the base station 105. For example, in the case of PUCCH format 3, the number of DMRS 330 symbols used to determine the number of resource blocks for the actual PUCCH repetition 305 transmission may be based on the number of DMRS 330 symbols in the nominal PUCCH repetition 305. For example, in slot diagram 303, a UE 115 may determine that the nominal (e.g., based on configuration information from a base station 105) number of DMRS 330 symbols for the transmission of PUCCH repetitions 305-*e* and 305-*f* may be two symbols, and the total number of OFDM symbols may be eight. When determining the number of DMRS 330 symbols, the UE 115 may assume that no intra-repetition hopping occurs. For example, the UE 115 may perform one hop per nominal repetition, rather than more than one.

Thus, an actual PUCCH repetition may contain fewer DMRS symbols than the number of DMRS symbols in a nominal PUCCH repetition. However, the UE 115 may use the number of DMRS symbols in a nominal PUCCH repetition to determine the number of resource blocks for the UE 115 to use to transmit the actual PUCCH repetition.

For example, a UE 115 may use a table, such as Table 1, to determine the number of DMRS symbols for the actual PUCCH repetition. The UE 115 may assume that frequency hopping is not performed for a PUCCH repetition when determining the DMRS symbols. The PUCCH formats shown in the table may be for PUCCH formats 3 and 4.

TABLE 1

| | DMRS Positioning for PUCCH formats: | | | |
|---|---|---|---|---|
| | DMRS position/within PUCCH span | | | |
| PUCCH | No Additional DMRS | | Additional DMRS | |
| length | No Hopping | Hopping | No Hopping | Hopping |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |

TABLE 1-continued

| | DMRS Positioning for PUCCH formats: | | | |
|---|---|---|---|---|
| | DMRS position/within PUCCH span | | | |
| PUCCH | No Additional DMRS | | Additional DMRS | |
| length | No Hopping | Hopping | No Hopping | Hopping |
| 13 | 2, 9 | | 1, 4, 7, 11 | |
| 14 | 3, 10 | | 1, 5, 8, 12 | |

Figure 4:
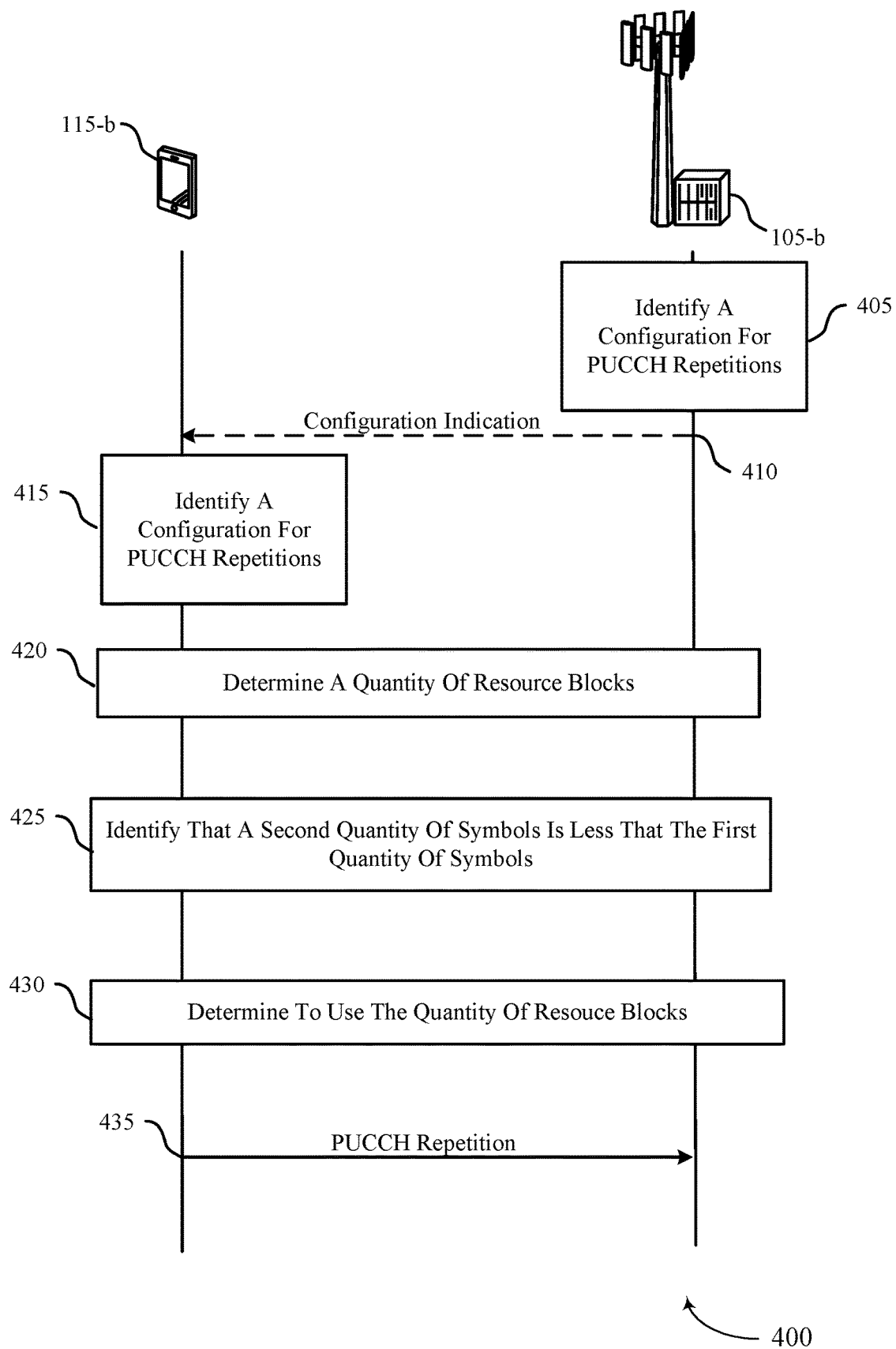
FIG. 4 illustrates an example of a process flow that supports resource block determination for control channel repetitions in accordance with aspects of the present disclosure.

FIG. 4 illustrates an example of a process flow 400 that supports resource block determination for control channel repetitions in accordance with aspects of the present disclosure. In some examples, process flow 400 may implement aspects of wireless communications systems 100 and 200. Process flow 400 includes UE 115-*b*, which may be an example of a UE 115 as described with respect to FIGS. 1 and 2. Process flow 400 also includes base station 105-*b*, which may be an example of a base station 105 as described with respect to FIGS. 1 and 2. UE 115-*b* and base station 105-*b* may implement an uplink control channel repetition communication configuration.

At 405, base station 105-*b* may identify a configuration for PUCCH repetitions to be transmitted by UE 115-*b*. The configuration may indicate a first quantity of repetitions of the one or more repetitions, and each repetition of the one or more repetitions including a first quantity of symbols indicated by the configuration.

At 410, base station 105-*b* may transmit a configuration indication. In some cases, UE 115-*b* may receive, from base station 105-*b*, an indication for UE 115-*b* to use one of a set of uplink control channel repetition types. In some cases, UE 115-*b* may receive, from base station 105-*b*, the configuration indication indicating the first quantity of repetitions and the first quantity of symbols. The configuration indication may correspond to RRC signaling (e.g., including a semi-persistent configuration) indicating the first quantity of repetitions and the first quantity of symbols.

At 415, UE 115-*b* may identify a configuration for one or more repetitions of an uplink control channel transmission (e.g., a PUCCH transmission). The configuration may indicate a first quantity of repetitions of the one or more repetitions, and each repetition of the one or more repetitions may include a first quantity of symbols.

At 420, UE 115-*b* may determine a quantity of resource blocks for each repetition of the one or more repetitions based on the first quantity of symbols. Base station 105-*b* may also determine a quantity of resource blocks for each repetition at 420.

UE 115-*b* may determine a quantity of DMRS symbols associated with the first quantity of symbols. UE 115-*b* may determine at 420, the quantity of resource blocks based on the determined quantity of DMRS symbols. UE 115-*b* may determine the quantity of DMRS symbols based on an assumption of an absence of the configuration to perform intra-repetition hopping.

Further, UE 115-*b* may determine, from a set of sets of uplink control channel resources, a set of uplink control channel resources on which to transmit the uplink control channel transmission. The quantity of resource blocks for the repetition may be based on the determined set of uplink control channel resources.

UE 115-*b* may also determine, from a set of uplink control channel formats, an uplink control channel format to use to transmit the uplink control channel transmission. The quantity of resource blocks for the repetition may be based on the determined uplink control channel format.

In some cases, UE 115-b may also determine the quantity of resource blocks for the uplink control channel transmission based on the first quantity of symbols, and a first set of values of a payload size, a code rate, and a modulation order for the uplink control channel transmission.

At 425, UE 115-b may identify that a second quantity of symbols available to UE 115-b to transmit a repetition of the one or more repetitions that may be less than the first quantity of symbols indicated by the configuration indication (e.g., the configuration indication received at 410). For example, UE 115-b may determine, for the repetition, that one or more symbols of the first quantity of symbols have been configured by base station 105-b for downlink transmissions. The second quantity of symbols for the repetition may be based on the first quantity of symbols and may exclude the one or more symbols that have been configured for the downlink transmissions.

In another case, UE 115-b may determine, for a first repetition of the one or more repetitions, that the first repetition crosses a slot boundary. In this case, UE 115-b may split the first repetition to generate the repetition associated with the identified second quantity of symbols, and zero or more additional repetitions.

At 430, UE 115-b may determine to use the quantity of resource blocks associated with the first quantity of symbols for the repetition on the second quantity of symbols.

At 435, UE 115-b may transmit, to base station 105-b, the repetition of the second quantity of symbols on the quantity of resource blocks determined based at least in part on the first quantity of symbols. UE 115-b may also transmit, to base station 105-b, a remaining one or more repetitions of the set of repetitions on the first quantity of symbols using the quantity of resource blocks.

Figure 5:
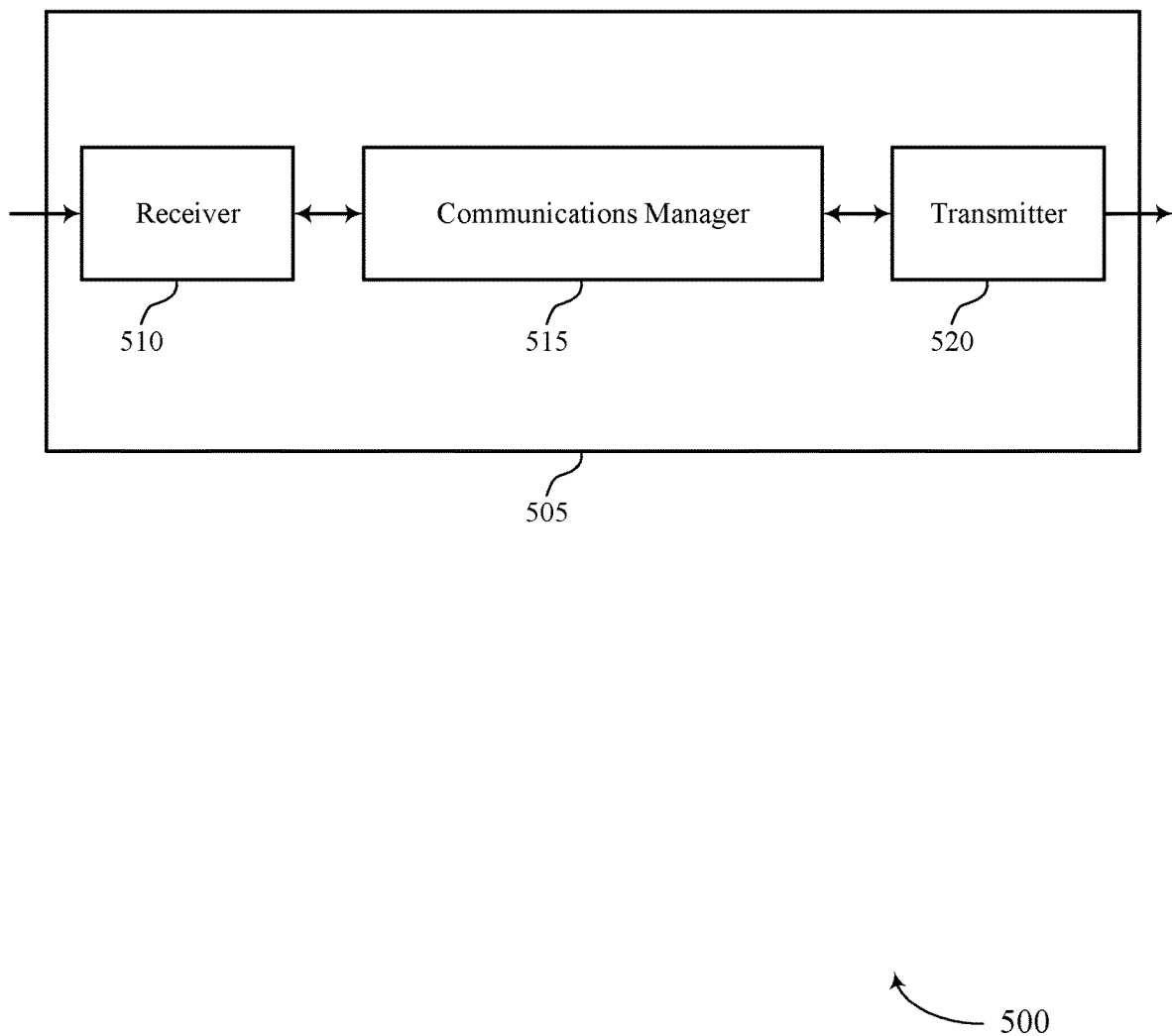
FIGS. 5 and 6 show block diagrams of devices that support resource block determination for control channel repetitions in accordance with aspects of the present disclosure.

FIG. 5 shows a block diagram 500 of a device 505 that supports resource block determination for control channel repetitions in accordance with aspects of the present disclosure. The device 505 may be an example of aspects of a UE 115 as described herein. The device 505 may include a receiver 510, a communications manager 515, and a transmitter 520. The device 505 may also include at least one processor. Each of these components may be in communication with one another (e.g., via one or more buses).

The receiver 510 may receive information such as packets, user data, or control information associated with various information channels (e.g., control channels, data channels, and information related to resource block determination for control channel repetitions). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a configuration for one or more repetitions of an uplink control channel transmission, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine, for the repetition on the second quantity of symbols, to use the quantity of resource blocks for each repetition of the one or more repetitions based at least in part on the first quantity of symbols for the repetition on the second quantity of symbols, and transmit, to a base station, the repetition on the second quantity of symbols on the quantity of resource blocks determined based at least in part on the first quantity of symbols. The communications manager 515 may be an example of aspects of the communications manager 810 described herein.

The communications manager 515, or its sub-components, may be implemented in hardware, software (e.g., executed by at least one processor), or any combination thereof. If implemented in code executed by at least one processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
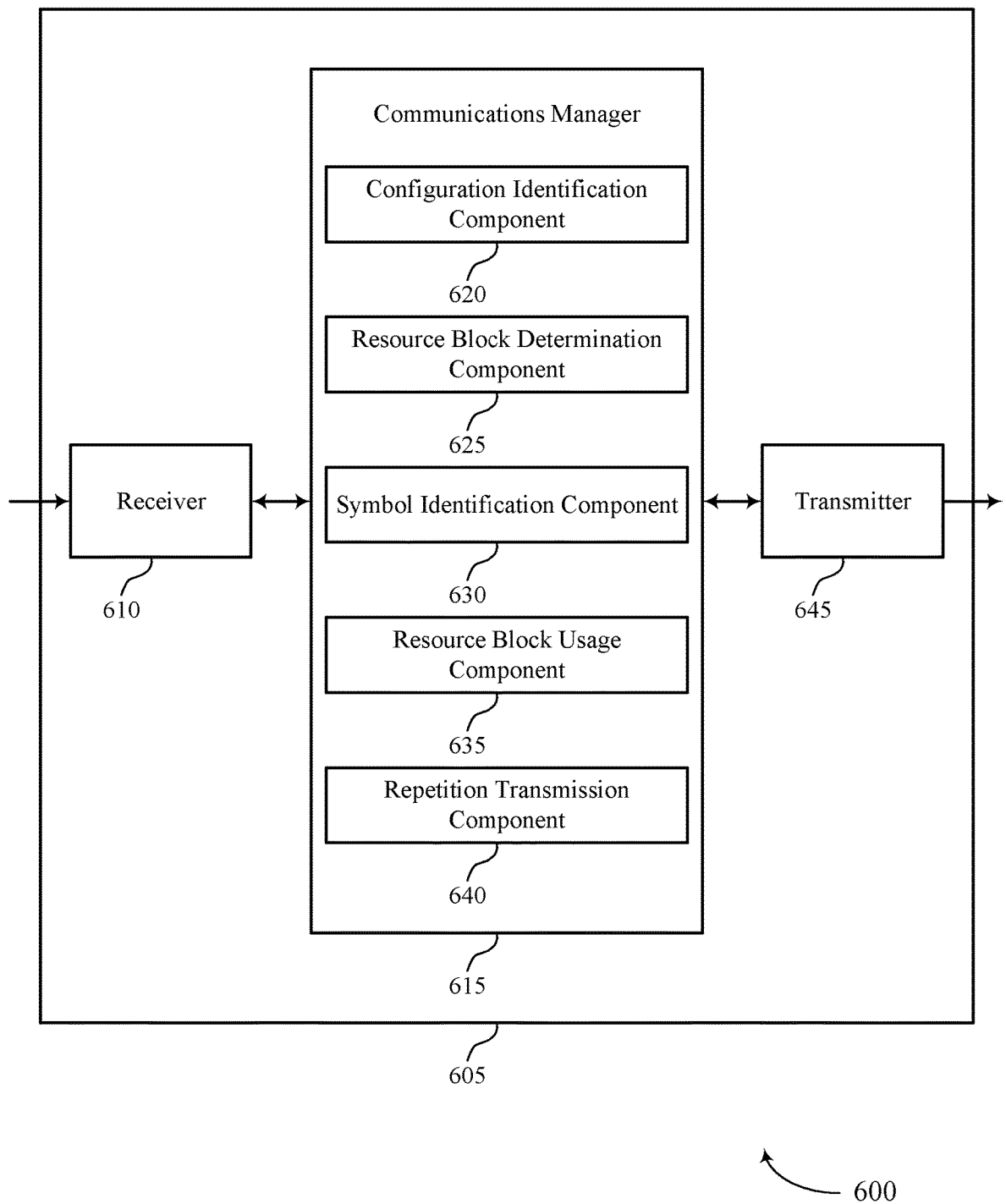

FIG. 6 shows a block diagram 600 of a device 605 that supports resource block determination for control channel repetitions in accordance with aspects of the present disclosure. The device 605 may be an example of aspects of a device 505, or a UE 115 as described herein. The device 605 may include a receiver 610, a communications manager 615, and a transmitter 645. The device 605 may also include at least one processor. Each of these components may be in communication with one another (e.g., via one or more buses).

The receiver 610 may receive information such as packets, user data, or control information associated with various information channels (e.g., control channels, data channels, and information related to resource block determination for control channel repetitions). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration identification component 620, a resource block determination component 625, a symbol identification component 630, a resource block usage component 635, and a repetition transmission component 640. The communications manager 615 may be an example of aspects of the communications manager 810 described herein.

The configuration identification component 620 may identify a configuration for one or more repetitions of an uplink control channel transmission, the configuration indicating a first quantity of repetitions of the one or more repetitions, and each repetition of the one or more repetitions including a first quantity of symbols indicated by the configuration.

The resource block determination component 625 may determine a quantity of resource blocks for each repetition of the one or more repetitions based on the first quantity of symbols.

The symbol identification component 630 may identify that a second quantity of symbols available to the UE to transmit a repetition of the one or more repetitions is less than the first quantity of symbols.

The resource block usage component 635 may determine to use the quantity of resource blocks for each repetition of the one or more repetitions based at least in part on the first quantity of symbols for the repetition on the second quantity of symbols.

The repetition transmission component 640 may transmit, to a base station, the repetition on the second quantity of symbols on the quantity of resource blocks determined based at least in part on the first quantity of symbols.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
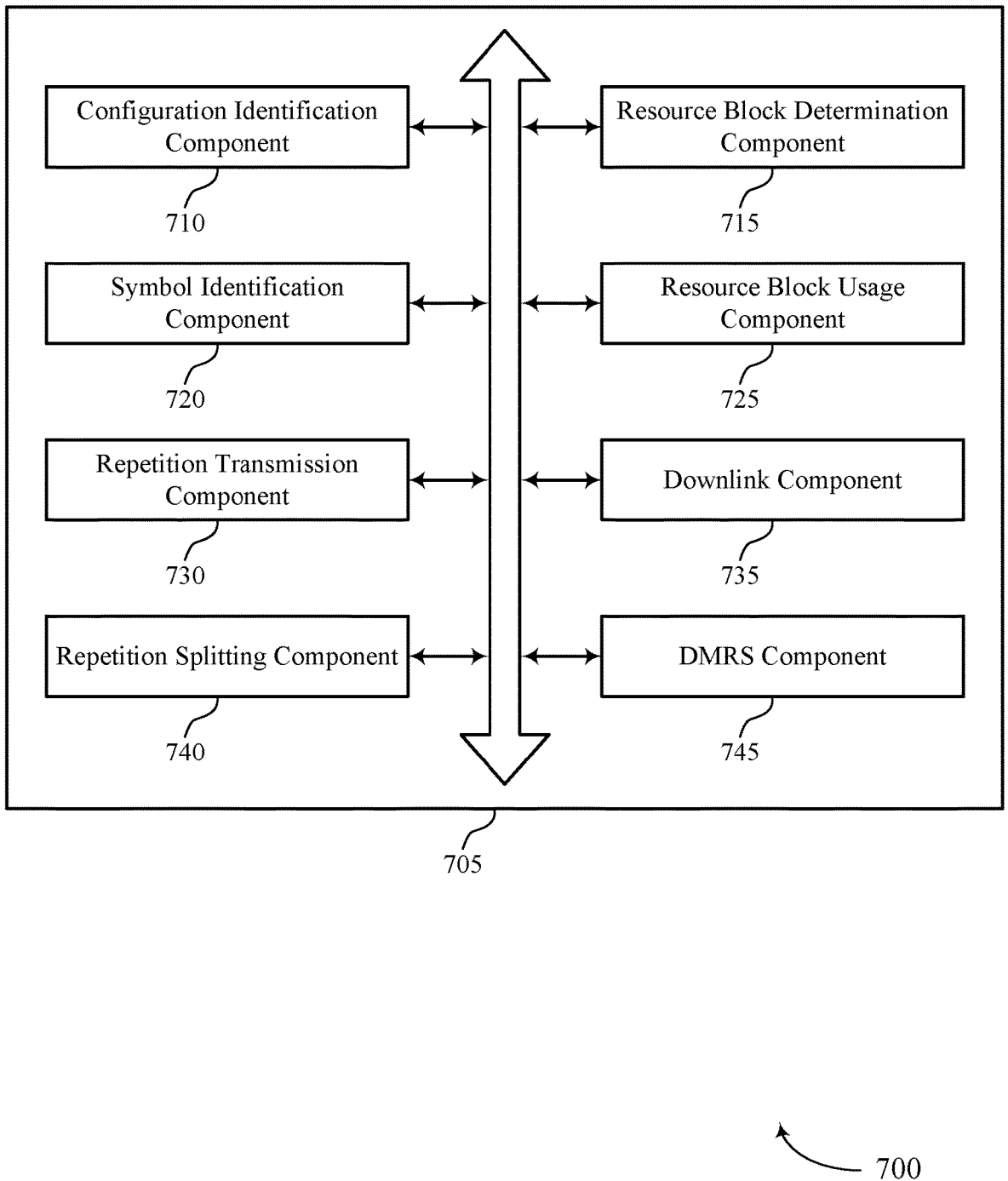
FIG. 7 shows a block diagram of a communications manager that supports resource block determination for control channel repetitions in accordance with aspects of the present disclosure.

FIG. 7 shows a block diagram 700 of a communications manager 705 that supports resource block determination for control channel repetitions in accordance with aspects of the present disclosure. The communications manager 705 may be an example of aspects of a communications manager 515, a communications manager 615, or a communications manager 810 described herein. The communications manager 705 may include a configuration identification component 710, a resource block determination component 715, a symbol identification component 720, a resource block usage component 725, a repetition transmission component 730, a downlink component 735, a repetition splitting component 740, and a DMRS component 745. Each of these modules may communicate, directly or indirectly, with one another (e.g., via one or more buses).

The configuration identification component 710 may identify a configuration for one or more repetitions of an uplink control channel transmission, the configuration indicating a first quantity of repetitions of the one or more repetitions, and each repetition of the one or more repetitions including a first quantity of symbols indicated by the configuration. In some examples, the configuration identification component 710 may receive, from the base station, the configuration indicating the first quantity of repetitions and the first quantity of symbols. In some cases, the configuration includes RRC signaling indicating the first quantity of repetitions and the first quantity of symbols.

The resource block determination component 715 may determine a quantity of resource blocks for each repetition of the one or more repetitions based on the first quantity of symbols. In some examples, the resource block determination component 715 may receive, from the base station, an indication for the UE to use one of a set of uplink control channel repetition types. In some examples, the resource block determination component 715 may determine the quantity of resource blocks further based on the received indication.

In some examples, the resource block determination component 715 may determine, from a set of sets of uplink control channel resources, a set of uplink control channel resources on which to transmit the uplink control channel transmission, where the quantity of resource blocks for the repetition is based at least in part on the determined set of uplink control channel resources.

The symbol identification component 720 may identify that a second quantity of symbols available to the UE to transmit a repetition of the one or more repetitions is less than the first quantity of symbols. In some examples, the symbol identification component 720 may determine the quantity of resource blocks based on the first quantity of repetitions and the first quantity of symbols.

The resource block usage component 725 may determine to use the quantity of resource blocks for each repetition of the one or more repetitions based at least in part on the first quantity of symbols for the repetition on the second quantity of symbols. In some examples, the resource block usage component 725 may determine, from a set of uplink control channel formats, an uplink control channel format to use to transmit the uplink control channel transmission, where the quantity of resource blocks for the repetition is based at least in part on the determined uplink control channel format. In some examples, the resource block usage component 725 may determine the quantity of resource blocks for the uplink control channel transmission based on the first quantity of symbols and a first set of values for a payload size, a code rate, and a modulation order for the uplink control channel transmission. In some examples, the resource block usage component 725 may transmit, to the base station, a remaining one or more repetitions of the set of repetitions on the first quantity of symbols using the quantity of resource blocks. In some cases, the uplink control channel format is a physical uplink control channel format two or a physical uplink control channel format three.

The repetition transmission component 730 may transmit, to a base station, the repetition on the second quantity of symbols on the quantity of resource blocks determined based at least in part on the first quantity of symbols.

The downlink component 735 may determine, for the repetition, that one or more symbols of the first quantity of symbols have been configured by the base station for downlink transmissions, the second quantity of symbols for the repetition excluding the one or more symbols that have been configured for the downlink transmissions.

The repetition splitting component 740 may determine, for a first repetition of the one or more repetitions, that the first repetition crosses a slot boundary. In some examples, splitting the first repetition to generate the repetition associated with the identified second quantity of symbols, and zero or more additional repetitions.

The DMRS component 745 may determine a quantity of DMRS symbols for each repetition of the one or more repetitions based at least in part on the first quantity of symbols, where the determining the quantity of resource blocks is further based on the determined quantity of DMRS symbols. In some examples, the DMRS component 745 may determine the quantity of DMRS symbols is based on an assumption of an absence of the configuration to perform intra-repetition hopping.

Figure 8:
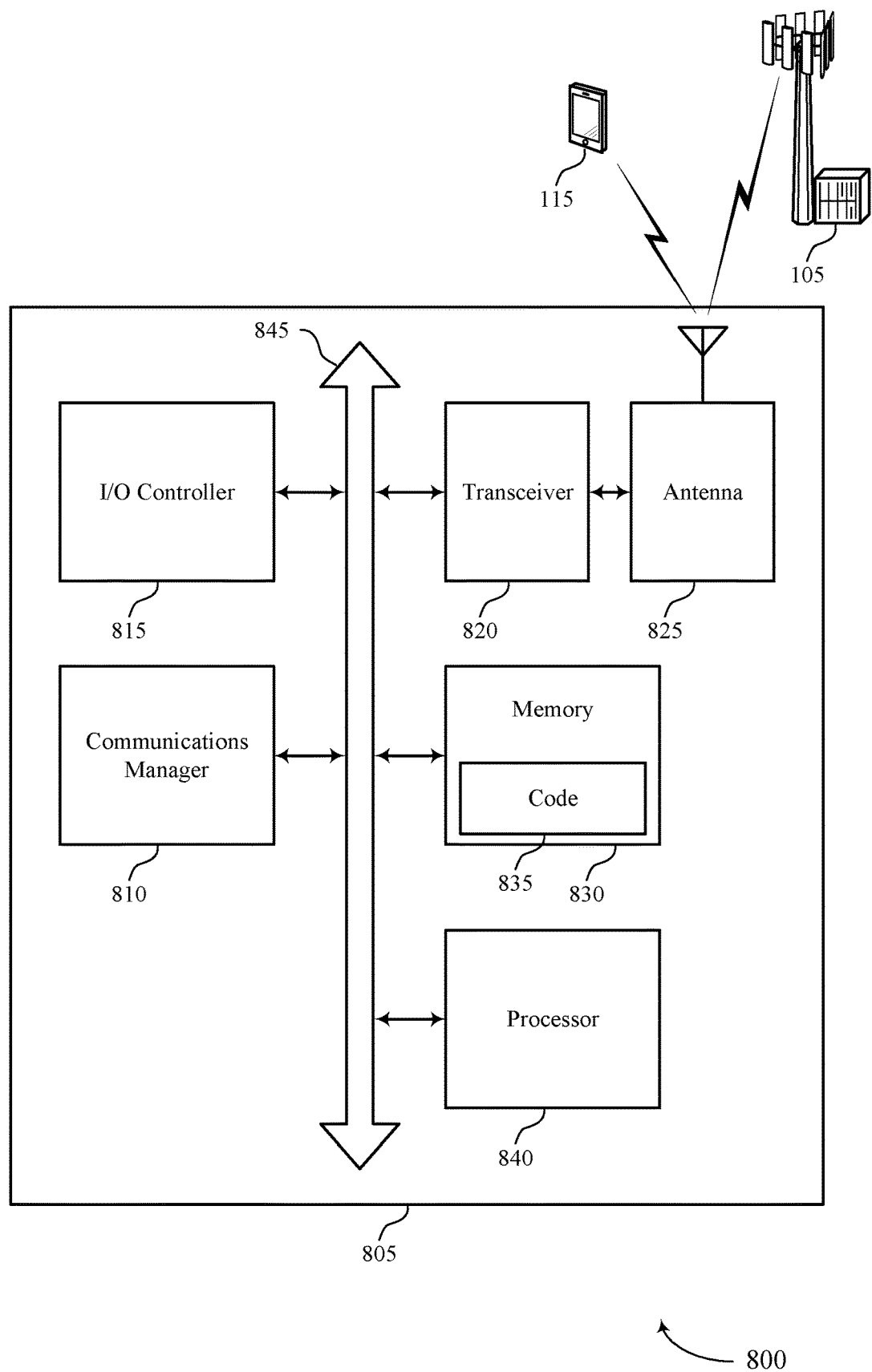
FIG. 8 shows a diagram of a system including a device that supports resource block determination for control channel repetitions in accordance with aspects of the present disclosure.

FIG. 8 shows a diagram of a system 800 including a device 805 that supports resource block determination for control channel repetitions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be coupled via one or more buses (e.g., bus 845).

The communications manager 810 may identify a configuration for one or more repetitions of an uplink control channel transmission, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine to use the quantity of resource blocks for each repetition of the one or more repetitions based at least in part on the first quantity of symbols for the repetition on the second quantity of symbols, and transmit, to a base station, the repetition on the second quantity of symbols on the quantity of resource blocks determined based at least in part on the first quantity of symbols.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the at least one processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource block determination for control channel repetitions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
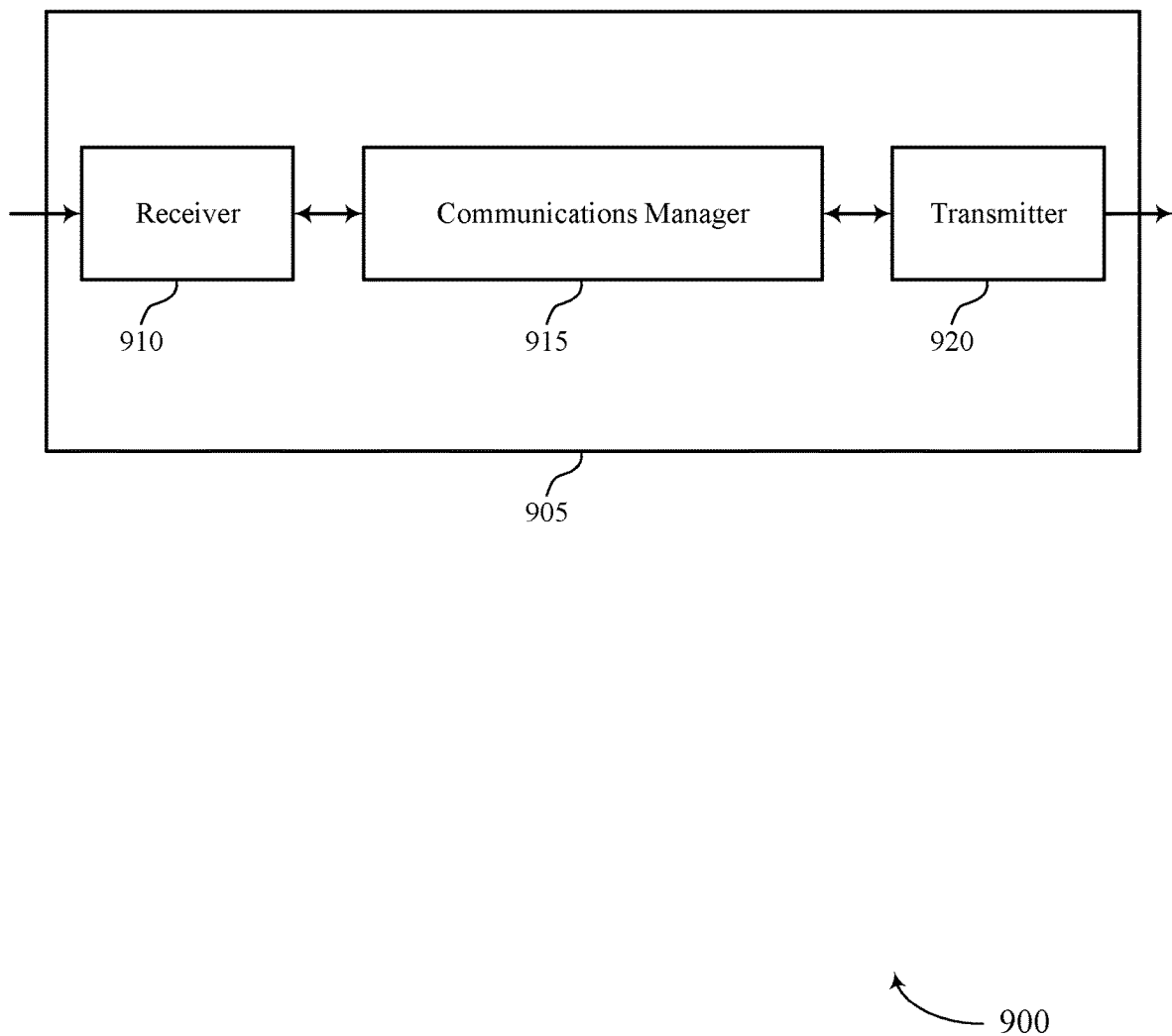
FIGS. 9 and 10 show block diagrams of devices that support resource block determination for control channel repetitions in accordance with aspects of the present disclosure.

FIG. 9 shows a block diagram 900 of a device 905 that supports resource block determination for control channel repetitions in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource block determination for control channel repetitions). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine to use the quantity of resource blocks determined based at least in part on the first quantity of symbols for the repetition on the second quantity of symbols, and receive, from the UE, the repetition on the second quantity of symbols on the quantity of resource blocks. The communications manager 915 may be an example of aspects of the communications manager 1210 described herein.

The communications manager 915, or its sub-components, may be implemented in hardware, software (e.g., executed by at least one processor), or any combination thereof. If implemented in code executed by at least one processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
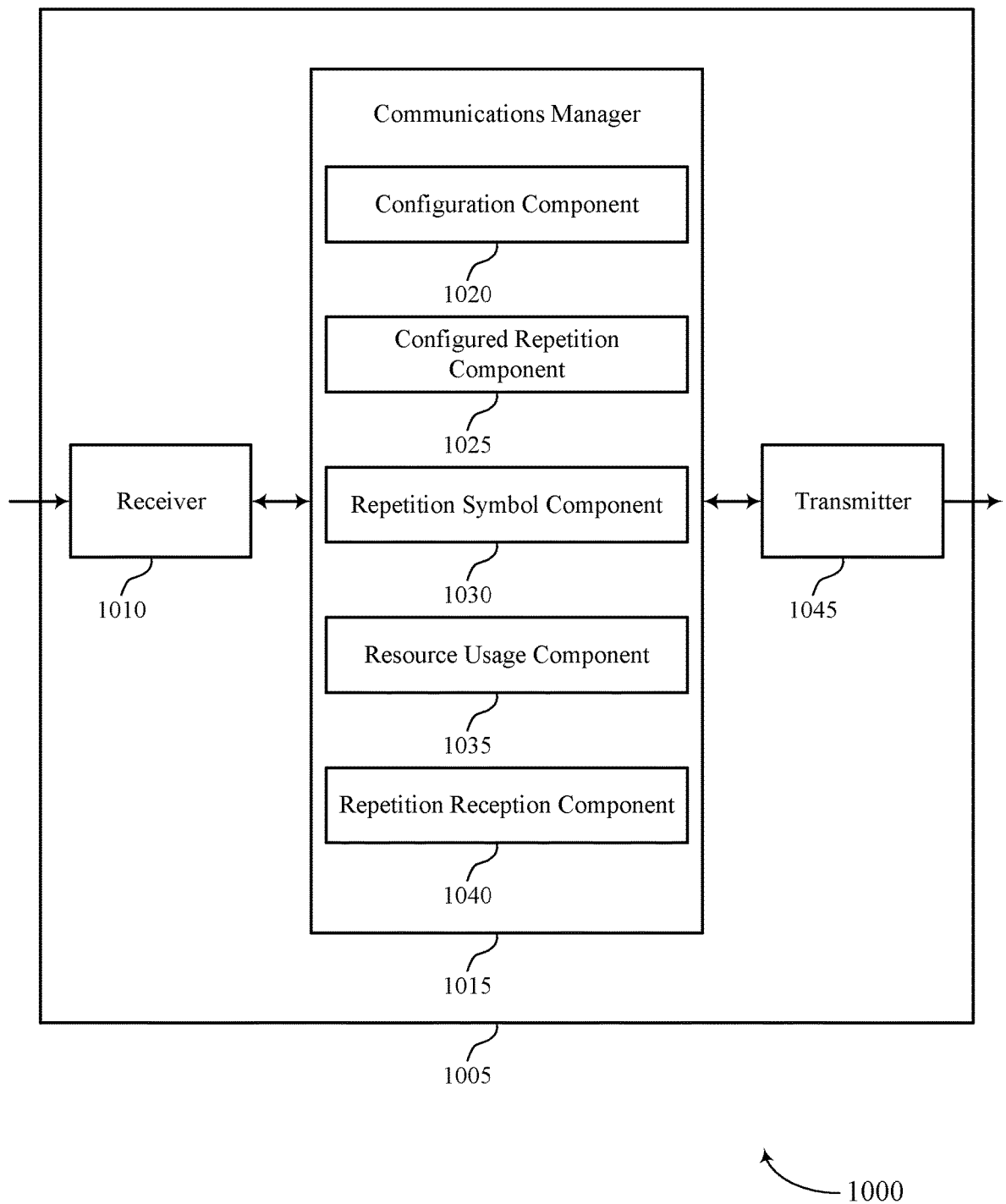

FIG. 10 shows a block diagram 1000 of a device 1005 that supports resource block determination for control channel repetitions in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include at least one processor. Each of these components may be in communication with one another (e.g., via one or more buses).

The receiver 1010 may receive information such as packets, user data, or control information associated with various information channels (e.g., control channels, data channels, and information related to resource block determination for control channel repetitions). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration component 1020, a configured repetition component 1025, a repetition symbol component 1030, a resource usage component 1035, and a repetition reception component 1040. The communications manager 1015 may be an example of aspects of the communications manager 1210 described herein.

The configuration component 1020 may identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration.

The configured repetition component 1025 may determine a quantity of resource blocks for each repetition of the one or more repetitions based on the first quantity of symbols.

The repetition symbol component 1030 may identify that a second quantity of symbols available to the UE to transmit a repetition of the one or more repetitions is less than the first quantity of symbols.

The resource usage component 1035 may determine to use the quantity of resource blocks for each repetition of the one or more repetitions based at least in part on the first quantity of symbols for the repetition on the second quantity of symbols.

The repetition reception component 1040 may receive, from the UE, the repetition on the second quantity of symbols on the quantity of resource blocks.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
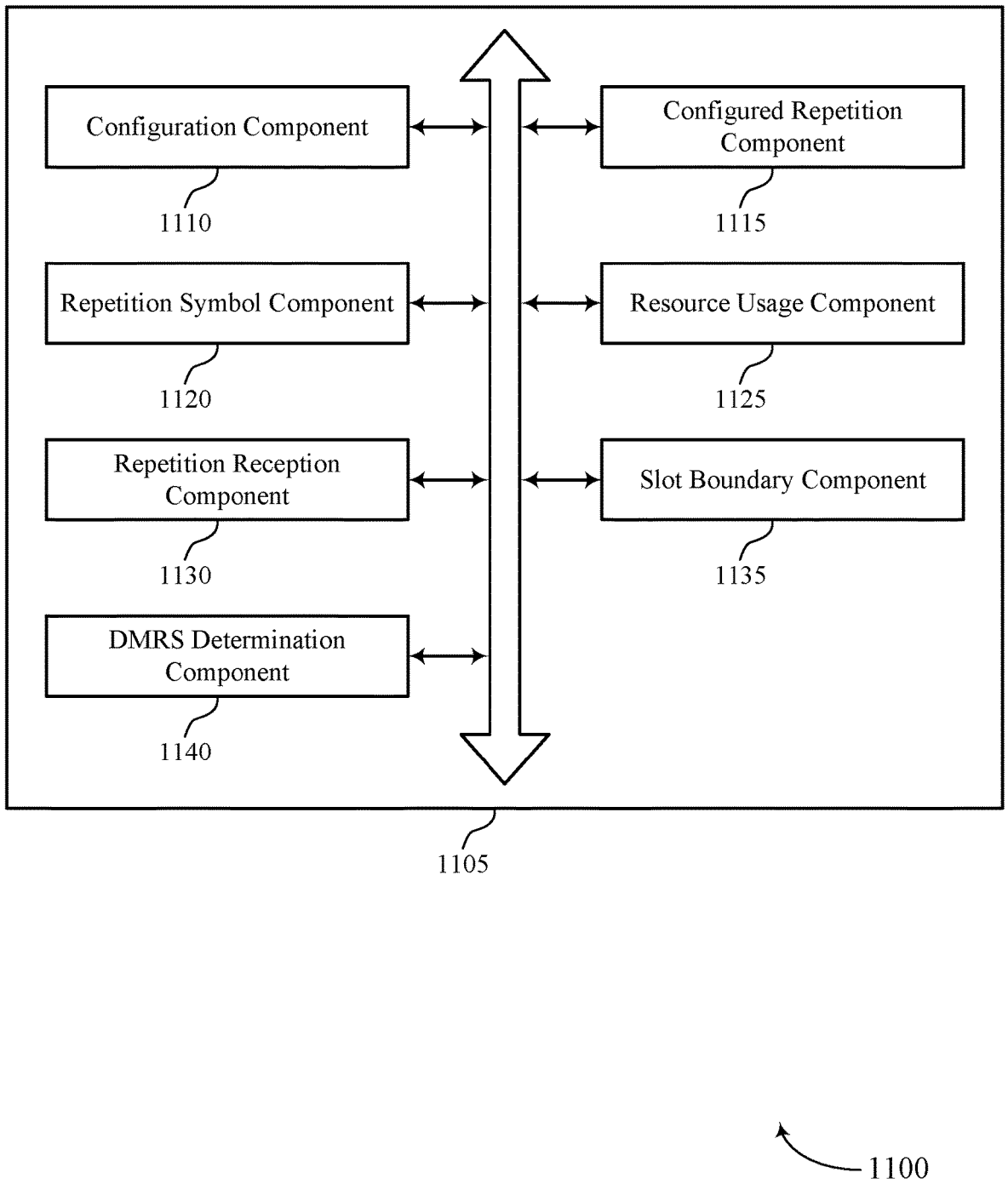
FIG. 11 shows a block diagram of a communications manager that supports resource block determination for control channel repetitions in accordance with aspects of the present disclosure.

FIG. 11 shows a block diagram 1100 of a communications manager 1105 that supports resource block determination for control channel repetitions in accordance with aspects of the present disclosure. The communications manager 1105 may be an example of aspects of a communications manager 915, a communications manager 1015, or a communications manager 1210 described herein. The communications manager 1105 may include a configuration component 1110, a configured repetition component 1115, a repetition symbol component 1120, a resource usage component 1125, a repetition reception component 1130, a slot boundary component 1135, and a DMRS determination component 1140. Each of these modules may communicate, directly or indirectly, with one another (e.g., via one or more buses).

The configuration component 1110 may identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration. In some examples, the configuration component 1110 may transmit, to the UE, an indication that the UE is to use one of a set of uplink control channel repetition types. In some examples, the configuration component 1110 may transmit, to the UE, the configuration indicating the first quantity of repetitions and the first quantity of symbols. In some examples, the configuration component 1110 may determine the quantity of resource blocks based on the first quantity of repetitions and the first quantity of symbols. In some cases, the configuration includes RRC signaling including a semi-persistent configuration indicating the first quantity of repetitions and the first quantity of symbols.

The configured repetition component 1115 may determine a quantity of resource blocks for each repetition of the one or more repetitions based on the first quantity of symbols.

The repetition symbol component 1120 may identify that a second quantity of symbols available to the UE to transmit a repetition of the one or more repetitions is less than the first quantity of symbols. In some examples, the repetition symbol component 1120 may determine, for the repetition, that one or more symbols of the first quantity of symbols have been configured for downlink transmissions, the second quantity of symbols for the repetition excluding the one or more symbols that have been configured for the downlink transmissions.

The resource usage component 1125 may determine to use the quantity of resource blocks for each repetition of the one or more repetitions based at least in part on the first quantity of symbols for the repetition on the second quantity of symbols. In some examples, the resource usage component 1125 may determine the quantity of resource blocks further based on the transmitted indication.

In some examples, the resource usage component 1125 may determine, from a set of sets of uplink control channel resources, a set of uplink control channel resources on which to transmit the uplink control channel transmission, where the quantity of resource blocks for the repetition is based at least in part on the determined set of uplink control channel resources. In some examples, the resource usage component 1125 may determine, from a set of uplink control channel formats, an uplink control channel format to use to transmit the uplink control channel transmission, where the quantity of resource blocks for the repetition is based at least in part on the determined uplink control channel format. In some examples, the resource usage component 1125 may determine the quantity of resource blocks for the uplink control channel transmission based on the first quantity of symbols and a first set of values for a payload size, a code rate, and a modulation order for the uplink control channel transmission.

The repetition reception component 1130 may receive, from the UE, the repetition on the second quantity of symbols on the quantity of resource blocks. In some examples, the repetition reception component 1130 may receive, from the UE, a remaining one or more repetitions of the set of repetitions on the first quantity of symbols using the quantity of resource blocks.

The slot boundary component 1135 may determine, for a first repetition of the one or more repetitions, that the first repetition crosses a slot boundary. In some examples, splitting the first repetition to generate the repetition associated with the identified second quantity of symbols, and zero or more additional repetitions.

The DMRS determination component 1140 may determine a quantity of DMRS symbols for each repetition of the one or more repetitions based at least in part on the first quantity of symbols, where the determining the quantity of resource blocks is further based on the determined quantity of DMRS symbols. In some examples, the DMRS determination component 1140 may determine the quantity of DMRS symbols is based on an assumption of an absence of the configuration to perform intra-repetition hopping.

Figure 12:
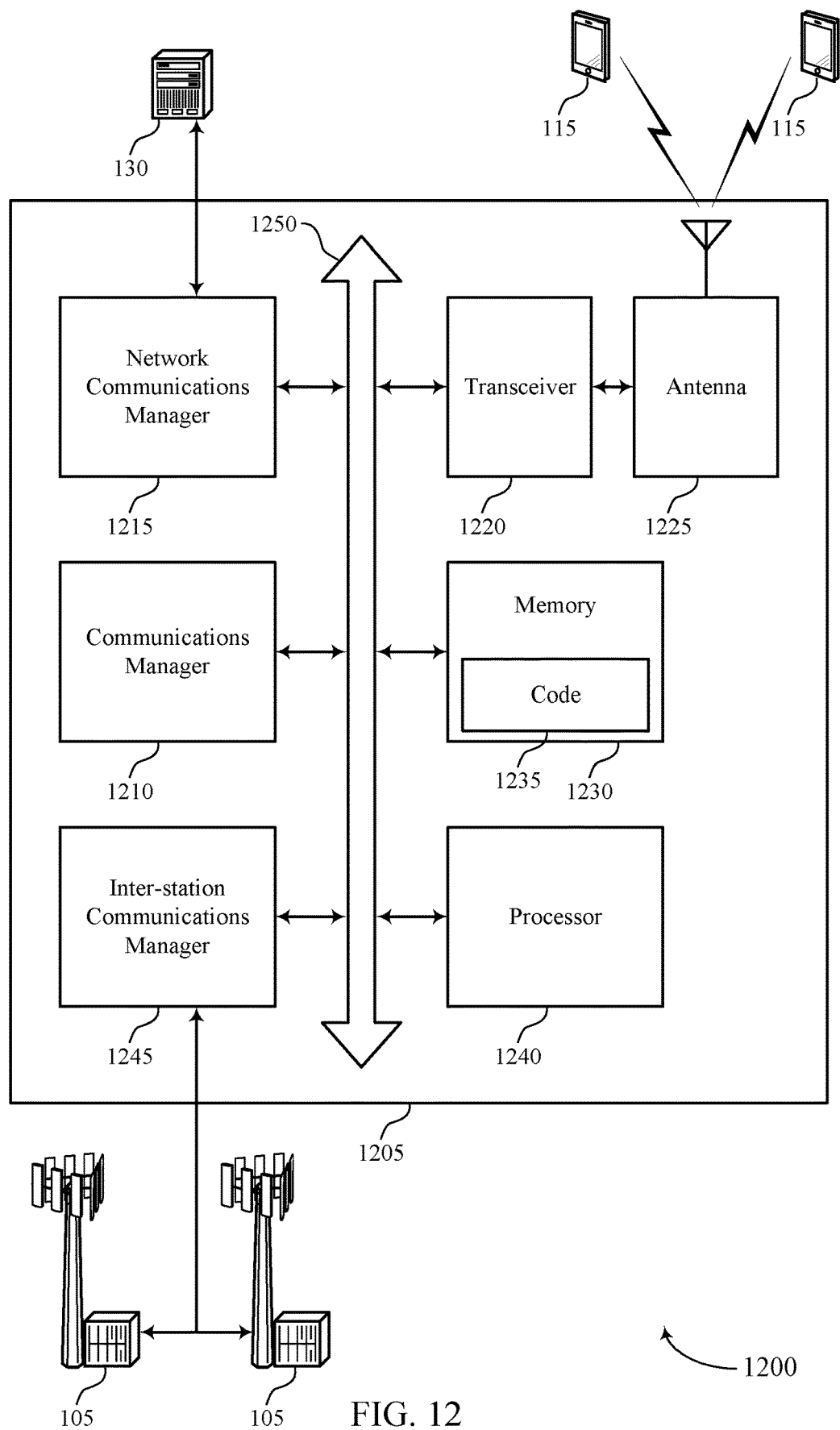
FIG. 12 shows a diagram of a system including a device that supports resource block determination for control channel repetitions in accordance with aspects of the present disclosure.

FIG. 12 shows a diagram of a system 1200 including a device 1205 that supports resource block determination for control channel repetitions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration, determine a quantity of resource blocks for each repetition of the one or more repetitions based on the first quantity of symbols, identify that a second quantity of symbols available to the UE to transmit a repetition of the one or more repetitions is less than the first quantity of symbols, determine to use the quantity of resource blocks determined based at least in part on the first quantity of symbols for the repetition on the second quantity of symbols, and receive, from the UE, the repetition on the second quantity of symbols on the quantity of resource blocks.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by at least one processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting resource block determination for control channel repetitions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
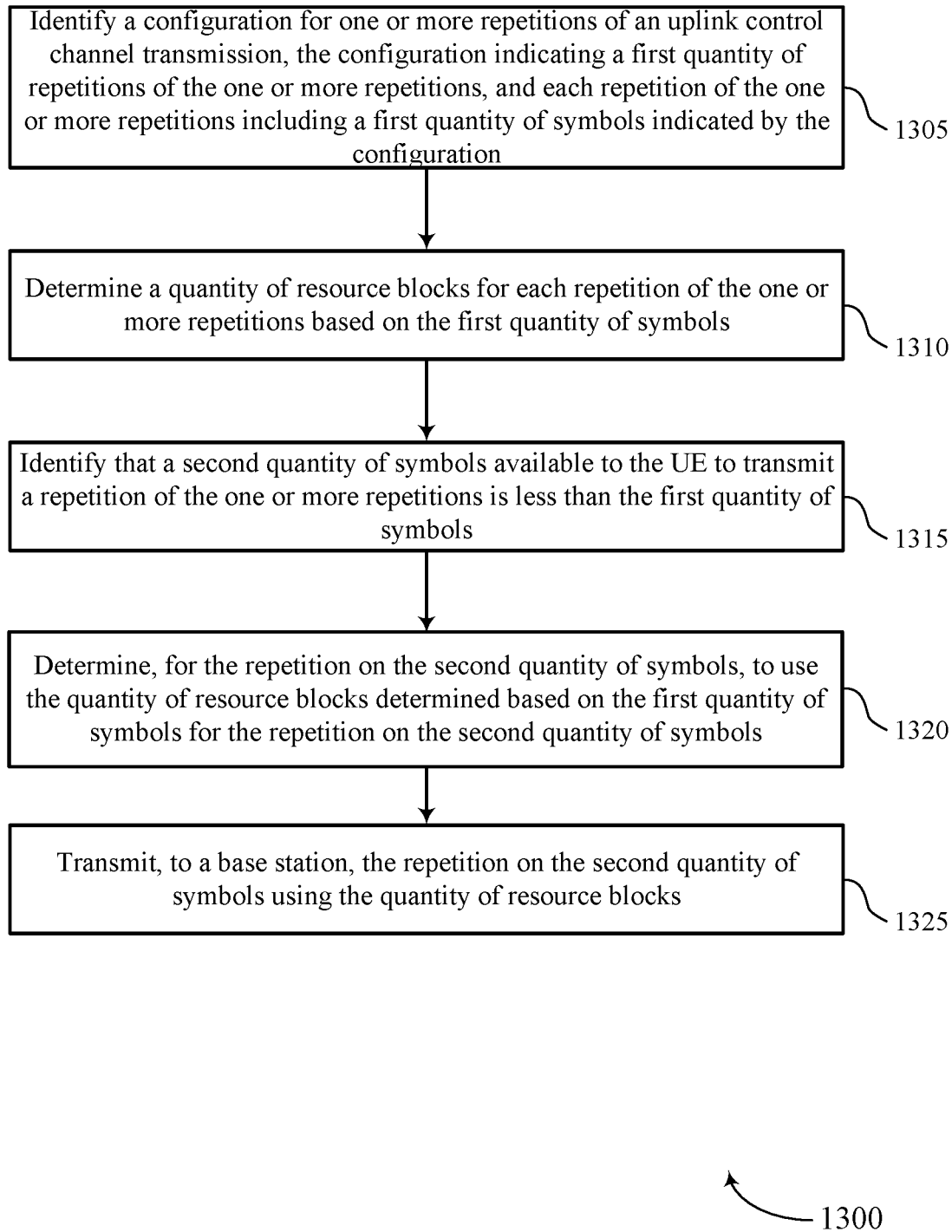
FIGS. 13 through 16 show flowcharts illustrating methods that support resource block determination for control channel repetitions in accordance with aspects of the present disclosure.

FIG. 13 shows a flowchart illustrating a method 1300 that supports resource block determination for control channel repetitions in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a configuration for one or more repetitions of an uplink control channel transmission, the configuration indicating a first quantity of repetitions of the one or more repetitions, and each repetition of the one or more repetitions including a first quantity of symbols indicated by the configuration. The operations of 1305 may be performed according to the methods described herein. In some examples, aspects of the operations of 1305 may be performed by a configuration identification component as described with reference to FIGS. 5 through 8.

At 1310, the UE may determine a quantity of resource blocks for each repetition of the one or more repetitions based on the first quantity of symbols. The operations of 1310 may be performed according to the methods described herein. In some examples, aspects of the operations of 1310 may be performed by a resource block determination component as described with reference to FIGS. 5 through 8.

At 1315, the UE may identify that a second quantity of symbols available to the UE to transmit a repetition of the one or more repetitions is less than the first quantity of symbols. The operations of 1315 may be performed according to the methods described herein. In some examples, aspects of the operations of 1315 may be performed by a symbol identification component as described with reference to FIGS. 5 through 8.

At 1320, the UE may determine, for the repetition on the second quantity of symbols, to use the quantity of resource blocks for each repetition of the one or more repetitions based on the first quantity of symbols for the repetition on the second quantity of symbols. The operations of 1320 may be performed according to the methods described herein. In some examples, aspects of the operations of 1320 may be performed by a resource block usage component as described with reference to FIGS. 5 through 8.

At 1325, the UE may transmit, to a base station, the repetition on the second quantity of symbols on the quantity of resource blocks determined based on the first quantity of symbols. The operations of 1325 may be performed according to the methods described herein. In some examples, aspects of the operations of 1325 may be performed by a repetition transmission component as described with reference to FIGS. 5 through 8.

Figure 14:
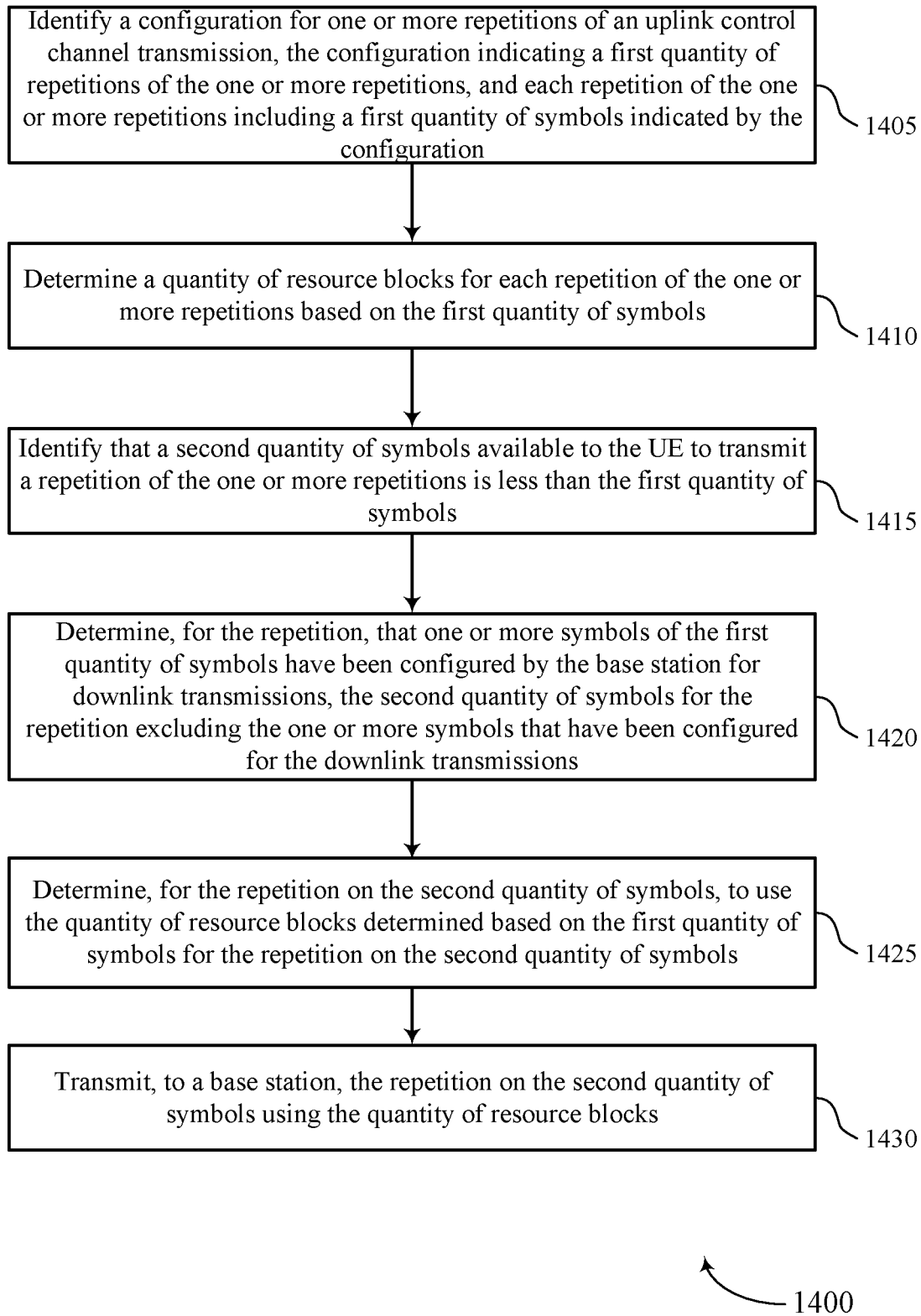

FIG. 14 shows a flowchart illustrating a method 1400 that supports resource block determination for control channel repetitions in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a configuration for one or more repetitions of an uplink control channel transmission, the configuration indicating a first quantity of repetitions of the one or more repetitions, and each repetition of the one or more repetitions including a first quantity of symbols indicated by the configuration. The operations of 1405 may be performed according to the methods described herein. In some examples, aspects of the operations of 1405 may be performed by a configuration identification component as described with reference to FIGS. 5 through 8.

At 1410, the UE may determine a quantity of resource blocks for each repetition of the one or more repetitions based on the first quantity of symbols. The operations of 1410 may be performed according to the methods described herein. In some examples, aspects of the operations of 1410 may be performed by a resource block determination component as described with reference to FIGS. 5 through 8.

At 1415, the UE may identify that a second quantity of symbols available to the UE to transmit a repetition of the one or more repetitions is less than the first quantity of symbols. The operations of 1415 may be performed according to the methods described herein. In some examples, aspects of the operations of 1415 may be performed by a symbol identification component as described with reference to FIGS. 5 through 8.

At 1420, the UE may determine, for the repetition, that one or more symbols of the first quantity of symbols have been configured by the base station for downlink transmissions, the second quantity of symbols for the repetition excluding the one or more symbols that have been configured for the downlink transmissions. The operations of 1420 may be performed according to the methods described herein. In some examples, aspects of the operations of 1420 may be performed by a downlink component as described with reference to FIGS. 5 through 8.

At 1425, the UE may determine, for the repetition on the second quantity of symbols, to use the quantity of resource blocks determined based on the first quantity of symbols for the repetition on the second quantity of symbols. The operations of 1425 may be performed according to the methods described herein. In some examples, aspects of the operations of 1425 may be performed by a resource block usage component as described with reference to FIGS. 5 through 8.

At 1430, the UE may transmit, to a base station, the repetition on the second quantity of symbols on the quantity of resource blocks for each repetition of the one or more repetitions on the first quantity of symbols. The operations of 1430 may be performed according to the methods described herein. In some examples, aspects of the operations of 1430 may be performed by a repetition transmission component as described with reference to FIGS. 5 through 8.

Figure 15:
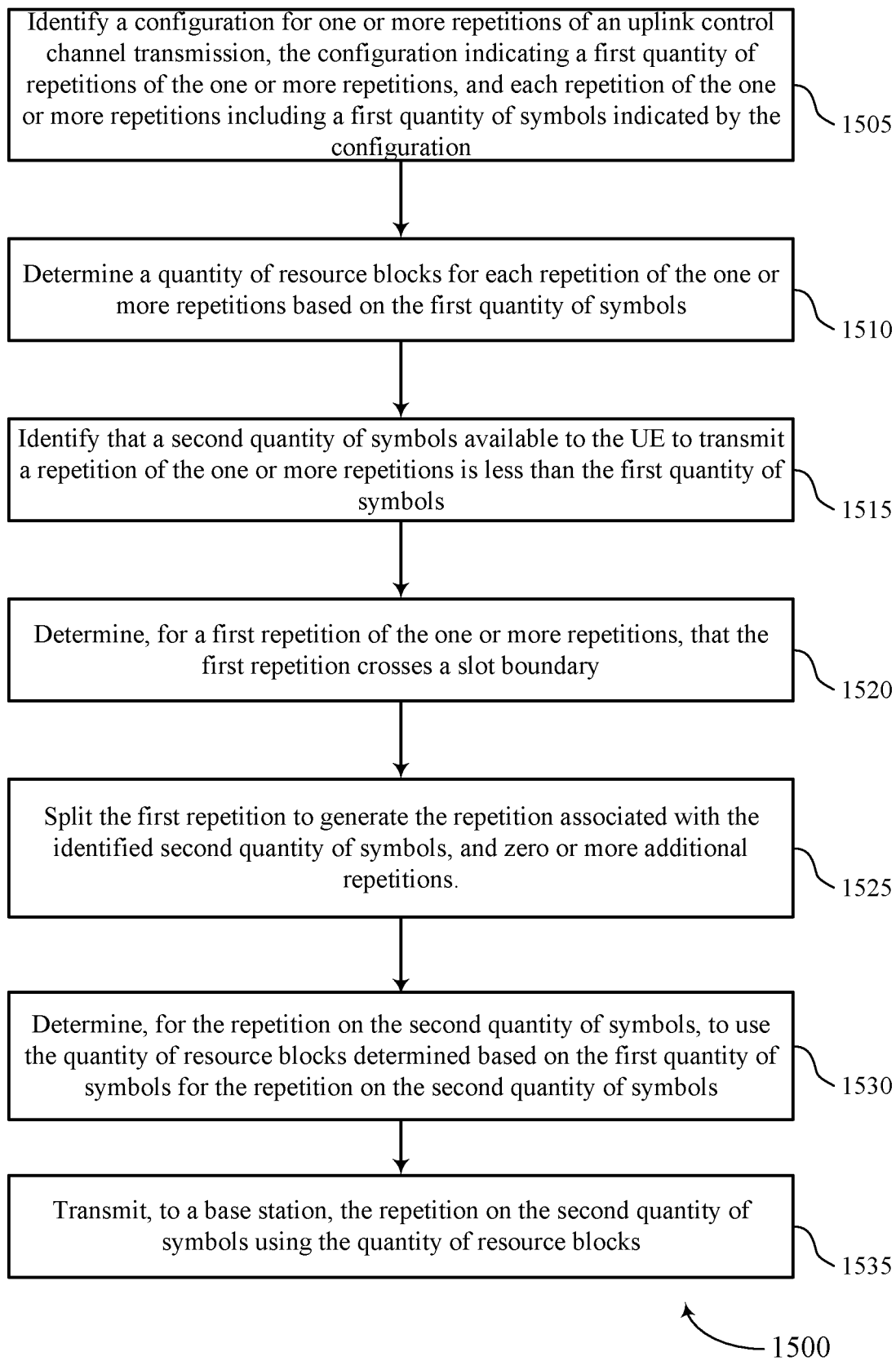

FIG. 15 shows a flowchart illustrating a method 1500 that supports resource block determination for control channel repetitions in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a configuration for one or more repetitions of an uplink control channel transmission, the configuration indicating a first quantity of repetitions of the one or more repetitions, and each repetition of the one or more repetitions including a first quantity of symbols indicated by the configuration. The operations of 1505 may be performed according to the methods described herein. In some examples, aspects of the operations of 1505 may be performed by a configuration identification component as described with reference to FIGS. 5 through 8.

At 1510, the UE may determine a quantity of resource blocks for each repetition of the one or more repetitions based on the first quantity of symbols. The operations of 1510 may be performed according to the methods described herein. In some examples, aspects of the operations of 1510 may be performed by a resource block determination component as described with reference to FIGS. 5 through 8.

At 1515, the UE may identify that a second quantity of symbols available to the UE to transmit a repetition of the one or more repetitions is less than the first quantity of symbols. The operations of 1515 may be performed according to the methods described herein. In some examples, aspects of the operations of 1515 may be performed by a symbol identification component as described with reference to FIGS. 5 through 8.

At 1520, the UE may determine, for a first repetition of the one or more repetitions, that the first repetition crosses a slot boundary. The operations of 1520 may be performed according to the methods described herein. In some examples, aspects of the operations of 1520 may be performed by a repetition splitting component as described with reference to FIGS. 5 through 8.

At 1525, the UE may split the first repetition to generate the repetition associated with the identified second quantity of symbols, and zero or more additional repetitions. The operations of 1525 may be performed according to the methods described herein. In some examples, aspects of the operations of 1525 may be performed by a repetition splitting component as described with reference to FIGS. 5 through 8.

At 1530, the UE may determine, for the repetition on the second quantity of symbols, to use the quantity of resource blocks determined based on the first quantity of symbols for the repetition on the second quantity of symbols. The operations of 1530 may be performed according to the methods described herein. In some examples, aspects of the operations of 1530 may be performed by a resource block usage component as described with reference to FIGS. 5 through 8.

At 1535, the UE may transmit, to a base station, the repetition on the second quantity of symbols on the quantity of resource blocks. The operations of 1535 may be performed according to the methods described herein. In some examples, aspects of the operations of 1535 may be performed by a repetition transmission component as described with reference to FIGS. 5 through 8.

Figure 16:
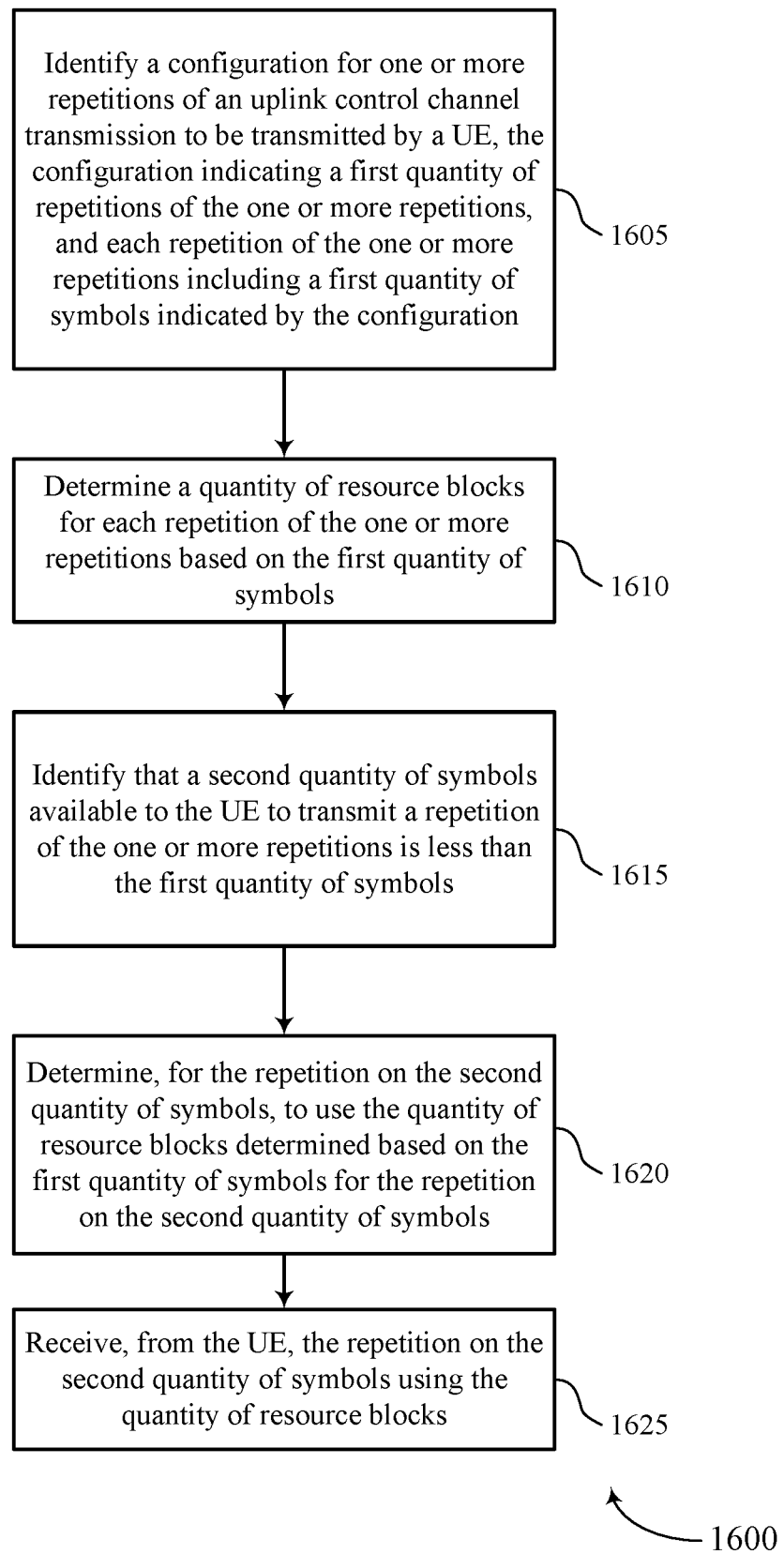

FIG. 16 shows a flowchart illustrating a method 1600 that supports resource block determination for control channel repetitions in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a configuration for one or more repetitions of an uplink control channel transmission to be transmitted by a UE, the configuration indicating a first quantity of repetitions of the one or more repetitions, and each repetition of the one or more repetitions including a first quantity of symbols indicated by the configuration. The operations of 1605 may be performed according to the methods described herein. In some examples, aspects of the operations of 1605 may be performed by a configuration component as described with reference to FIGS. 9 through 12.

At 1610, the base station may determine a quantity of resource blocks for each repetition of the one or more repetitions based on the first quantity of symbols. The operations of 1610 may be performed according to the methods described herein. In some examples, aspects of the operations of 1610 may be performed by a configured repetition component as described with reference to FIGS. 9 through 12.

At 1615, the base station may identify that a second quantity of symbols available to the UE to transmit a repetition of the one or more repetitions is less than the first quantity of symbols. The operations of 1615 may be performed according to the methods described herein. In some examples, aspects of the operations of 1615 may be performed by a repetition symbol component as described with reference to FIGS. 9 through 12.

At 1620, the base station may determine, for the repetition on the second quantity of symbols, to use the quantity of resource blocks determined based on the first quantity of symbols for the repetition on the second quantity of symbols. The operations of 1620 may be performed according to the methods described herein. In some examples, aspects of the operations of 1620 may be performed by a resource usage component as described with reference to FIGS. 9 through 12.

At 1625, the base station may receive, from the UE, the repetition on the second quantity of symbols on the quantity of resource blocks. The operations of 1625 may be performed according to the methods described herein. In some examples, aspects of the operations of 1625 may be performed by a repetition reception component as described with reference to FIGS. 9 through 12.

The following provides an overview of aspects of the present disclosure:

Aspect 1: A method for wireless communications at a UE, comprising: identifying a configuration for one or more repetitions of an uplink control channel transmission, the configuration indicating a first quantity of repetitions of the one or more repetitions, and each repetition of the one or more repetitions comprising a first quantity of symbols indicated by the configuration; determining a quantity of resource blocks for each repetition of the one or more repetitions based at least in part on the first quantity of symbols; identifying that a second quantity of symbols available to the UE to transmit a repetition of the one or more repetitions is less than the first quantity of symbols; determining, for the repetition on the second quantity of symbols, to use the quantity of resource blocks determined based at least in part on the first quantity of symbols; and transmitting, to a base station, the repetition on the second quantity of symbols on the quantity of resource blocks.

Aspect 2: The method of aspect 1, further comprising: determining, for the repetition, that one or more symbols of the first quantity of symbols have been configured by the base station for downlink transmissions, the second quantity of symbols for the repetition excluding the one or more symbols that have been configured for the downlink transmissions.

Aspect 3: The method of any of aspects 1 through 2, further comprising: determining, for a first repetition of the one or more repetitions, that the first repetition crosses a slot boundary; and splitting the first repetition to generate the repetition associated with the identified second quantity of symbols, and zero or more additional repetitions.

Aspect 4: The method of any of aspects 1 through 3, further comprising: receiving, from the base station, an indication for the UE to use one of a plurality of uplink control channel repetition types; and determining the quantity of resource blocks further based at least in part on the received indication.

Aspect 5: The method of any of aspects 1 through 4, further comprising: determining a quantity of demodulation reference signal symbols associated with the first quantity of symbols, wherein the determining the quantity of resource blocks is further based at least in part on the determined quantity of demodulation reference signal symbols.

Aspect 6: The method of aspect 5, wherein determining the quantity of demodulation reference signal symbols is based at least in part on an assumption of an absence of the configuration to perform intra-repetition hopping.

Aspect 7: The method of any of aspects 1 through 6, further comprising: determining, from a plurality of sets of uplink control channel resources, a set of uplink control channel resources on which to transmit the uplink control channel transmission, wherein the quantity of resource blocks for the repetition is based at least in part on the determined set of uplink control channel resources.

Aspect 8: The method of any of aspects 1 through 7, further comprising: determining, from a plurality of uplink control channel formats, an uplink control channel format to use to transmit the uplink control channel transmission, wherein the quantity of resource blocks for the repetition is based at least in part on the determined uplink control channel format.

Aspect 9: The method of aspect 8, wherein the uplink control channel format is a physical uplink control channel format two or a physical uplink control channel format three.

Aspect 10: The method of any of aspects 1 through 9, further comprising: determining the quantity of resource blocks for the uplink control channel transmission based at least in part on the first quantity of symbols and a first set of values for a payload size, a code rate, and a modulation order for the uplink control channel transmission.

Aspect 11: The method of any of aspects 1 through 10, further comprising: receiving, from the base station, the configuration indicating the first quantity of repetitions and the first quantity of symbols; and determining the quantity of resource blocks based at least in part on the first quantity of repetitions and the first quantity of symbols.

Aspect 12: The method of aspect 11, wherein the configuration comprises radio resource control signaling indicating the first quantity of repetitions and the first quantity of symbols.

Aspect 13: The method of any of aspects 1 through 12, wherein the one or more repetitions comprise a plurality of repetitions, the method further comprising: transmitting, to the base station, a remaining one or more repetitions of the plurality of repetitions on the first quantity of symbols on the quantity of resource blocks.

Aspect 14: A method for wireless communications at a base station, comprising: identifying a configuration for one or more repetitions of an uplink control channel transmission to be transmitted by a UE, the configuration indicating a first quantity of repetitions of the one or more repetitions, and each repetition of the one or more repetitions comprising a first quantity of symbols indicated by the configuration; determining a quantity of resource blocks for each repetition of the one or more repetitions based at least in part on the first quantity of symbols; identifying that a second quantity of symbols available to the UE to transmit a repetition of the one or more repetitions is less than the first quantity of symbols; determining, for the repetition on the second quantity of symbols, to use the quantity of resource blocks determined based at least in part on the first quantity of symbols for the repetition on the second quantity of symbols; and receiving, from the UE, the repetition on the second quantity of symbols on the quantity of resource blocks.

Aspect 15: The method of aspect 14, further comprising: determining, for the repetition, that one or more symbols of the first quantity of symbols have been configured for downlink transmissions, the second quantity of symbols for the repetition excluding the one or more symbols that have been configured for the downlink transmissions.

Aspect 16: The method of any of aspects 14 through 15, further comprising: determining, for a first repetition of the one or more repetitions, that the first repetition crosses a slot boundary; and splitting the first repetition to generate the repetition associated with the identified second quantity of symbols, and zero or more additional repetitions.

Aspect 17: The method of any of aspects 14 through 16, further comprising: transmitting, to the UE, an indication that the UE is to use one of a plurality of uplink control channel repetition types; and determining the quantity of resource blocks further based at least in part on the transmitted indication.

Aspect 18: The method of any of aspects 14 through 17, further comprising: determining a quantity of demodulation reference signal symbols associated with the first quantity of symbols, wherein the determining the quantity of resource blocks is further based at least in part on the determined quantity of demodulation reference signal symbols.

Aspect 19: The method of aspect 18, wherein: determining the quantity of demodulation reference signal symbols is based at least in part on an assumption of an absence of the configuration to perform intra-repetition hopping.

Aspect 20: The method of any of aspects 14 through 19, further comprising: determining, from a plurality of sets of uplink control channel resources, a set of uplink control channel resources on which to transmit the uplink control channel transmission, wherein the quantity of resource blocks for the repetition is based at least in part on the determined set of uplink control channel resources.

Aspect 21: The method of any of aspects 14 through 20, further comprising: determining, from a plurality of uplink control channel formats, an uplink control channel format to use to transmit the uplink control channel transmission, wherein the quantity of resource blocks for the repetition is based at least in part on the determined uplink control channel format.

Aspect 22: An apparatus for wireless communications at a UE, comprising at least one processor; memory coupled (e.g., operatively, communicatively, functionally, electronically, or electrically) to the at least one processor; and instructions stored in the memory and executable by the at least one processor to cause the apparatus to perform a method of any of aspects 1 through 13.

Aspect 23: An apparatus for wireless communications at a UE, comprising at least one means for performing a method of any of aspects 1 through 13.

Aspect 24: A non-transitory computer-readable medium storing code for wireless communications at a UE, the code comprising instructions executable by at least one processor to perform a method of any of aspects 1 through 13.

Aspect 25: An apparatus for wireless communications at a base station, comprising at least one processor; memory coupled (e.g., operatively, communicatively, functionally, electronically, or electrically) to the at least one processor; and instructions stored in the memory and executable by the at least one processor to cause the apparatus to perform a method of any of aspects 14 through 21.

Aspect 26: An apparatus for wireless communications at a base station, comprising at least one means for performing a method of any of aspects 14 through 21.

Aspect 27: A non-transitory computer-readable medium storing code for wireless communications at a base station, the code comprising instructions executable by at least one processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the at least one processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying a configuration for one or more repetitions of an uplink control channel transmission, the configuration indicating a first quantity of repetitions of the one or more repetitions, and each repetition of the one or more repetitions comprising a first quantity of symbols indicated by the configuration;
    determining a quantity of resource blocks for each repetition of the one or more repetitions based at least in part on the first quantity of symbols;
    identifying that a second quantity of symbols available to the UE to transmit a repetition of the one or more repetitions is less than the first quantity of symbols;
    determining, for the repetition on the second quantity of symbols, to use the quantity of resource blocks determined based at least in part on the first quantity of symbols; and
    transmitting, to a base station, the repetition on the second quantity of symbols on the quantity of resource blocks.

2. The method of claim 1, further comprising:
    determining, for the repetition, that one or more symbols of the first quantity of symbols have been configured by the base station for downlink transmissions, the second quantity of symbols for the repetition excluding the one or more symbols that have been configured for the downlink transmissions.

3. The method of claim 1, further comprising:
    determining, for a first repetition of the one or more repetitions, that the first repetition crosses a slot boundary; and
    splitting the first repetition to generate the repetition associated with the identified second quantity of symbols, and zero or more additional repetitions.

4. The method of claim 1, further comprising:
    receiving, from the base station, an indication for the UE to use one of a plurality of uplink control channel repetition types; and
    determining the quantity of resource blocks further based at least in part on the received indication.

5. The method of claim 1, further comprising:
    determining a quantity of demodulation reference signal symbols associated with the first quantity of symbols, wherein the determining the quantity of resource blocks is further based at least in part on the determined quantity of demodulation reference signal symbols.

6. The method of claim 5, wherein:
    determining the quantity of demodulation reference signal symbols is based at least in part on an assumption of an absence of the configuration to perform intra-repetition hopping.

7. The method of claim 1, further comprising:
    determining, from a plurality of sets of uplink control channel resources, a set of uplink control channel resources on which to transmit the uplink control channel transmission, wherein the quantity of resource blocks for the repetition is based at least in part on the determined set of uplink control channel resources.

8. The method of claim 1, further comprising:
    determining, from a plurality of uplink control channel formats, an uplink control channel format to use to transmit the uplink control channel transmission, wherein the quantity of resource blocks for the repetition is based at least in part on the determined uplink control channel format.

9. The method of claim 8, wherein the uplink control channel format is a physical uplink control channel format two or a physical uplink control channel format three.

10. The method of claim 1, further comprising:
    determining the quantity of resource blocks for the uplink control channel transmission based at least in part on the first quantity of symbols and a first set of values for a payload size, a code rate, and a modulation order for the uplink control channel transmission.

11. The method of claim 1, further comprising:
    receiving, from the base station, the configuration indicating the first quantity of repetitions and the first quantity of symbols; and
    determining the quantity of resource blocks based at least in part on the first quantity of repetitions and the first quantity of symbols.

12. The method of claim 11, wherein the configuration comprises radio resource control signaling indicating the first quantity of repetitions and the first quantity of symbols.

13. The method of claim 1, wherein the one or more repetitions comprise a plurality of repetitions, the method further comprising:
    transmitting, to the base station, a remaining one or more repetitions of the plurality of repetitions on the first quantity of symbols on the quantity of resource blocks.

14. A method for wireless communications at a base station, comprising:
    identifying a configuration for one or more repetitions of an uplink control channel transmission to be transmitted by a user equipment (UE), the configuration indicating a first quantity of repetitions of the one or more repetitions, and each repetition of the one or more repetitions comprising a first quantity of symbols indicated by the configuration;
    determining a quantity of resource blocks for each repetition of the one or more repetitions based at least in part on the first quantity of symbols;
    identifying that a second quantity of symbols available to the UE to transmit a repetition of the one or more repetitions is less than the first quantity of symbols;
    determining, for the repetition on the second quantity of symbols, to use the quantity of resource blocks determined based at least in part on the first quantity of symbols for the repetition on the second quantity of symbols; and receiving, from the UE, the repetition on the second quantity of symbols on the quantity of resource blocks.

15. The method of claim 14, further comprising:
determining, for the repetition, that one or more symbols of the first quantity of symbols have been configured for downlink transmissions, the second quantity of symbols for the repetition excluding the one or more symbols that have been configured for the downlink transmissions.

16. The method of claim 14, further comprising:
determining, for a first repetition of the one or more repetitions, that the first repetition crosses a slot boundary; and
splitting the first repetition to generate the repetition associated with the identified second quantity of symbols, and zero or more additional repetitions.

17. The method of claim 14, further comprising:
transmitting, to the UE, an indication that the UE is to use one of a plurality of uplink control channel repetition types; and
determining the quantity of resource blocks further based at least in part on the transmitted indication.

18. The method of claim 14, further comprising:
determining a quantity of demodulation reference signal symbols associated with the first quantity of symbols, wherein the determining the quantity of resource blocks is further based at least in part on the determined quantity of demodulation reference signal symbols.

19. The method of claim 18, wherein:
determining the quantity of demodulation reference signal symbols is based at least in part on an assumption of an absence of the configuration to perform intra-repetition hopping.

20. The method of claim 14, further comprising:
determining, from a plurality of sets of uplink control channel resources, a set of uplink control channel resources on which to transmit the uplink control channel transmission, wherein the quantity of resource blocks for the repetition is based at least in part on the determined set of uplink control channel resources.

21. The method of claim 14, further comprising:
determining, from a plurality of uplink control channel formats, an uplink control channel format to use to transmit the uplink control channel transmission, wherein the quantity of resource blocks for the repetition is based at least in part on the determined uplink control channel format.

22. An apparatus for wireless communications at a user equipment (UE), comprising:
at least one processor,
memory coupled with the at least one processor; and
instructions stored in the memory and executable by the at least one processor to cause the apparatus to:
identify a configuration for one or more repetitions of an uplink control channel transmission, the configuration indicating a first quantity of repetitions of the one or more repetitions, and each repetition of the one or more repetitions comprising a first quantity of symbols indicated by the configuration;
determine a quantity of resource blocks for each repetition of the one or more repetitions based at least in part on the first quantity of symbols;
identify that a second quantity of symbols available to the UE to transmit a repetition of the one or more repetitions is less than the first quantity of symbols;
determine, for the repetition on the second quantity of symbols, to use the quantity of resource blocks determined based at least in part on the first quantity of symbols for the repetition on the second quantity of symbols; and
transmit, to a base station, the repetition on the second quantity of symbols on the quantity of resource blocks.

23. The apparatus of claim 22, wherein the instructions are further executable by the at least one processor to cause the apparatus to:
determine, for the repetition, that one or more symbols of the first quantity of symbols have been configured by the base station for downlink transmissions, the second quantity of symbols for the repetition excluding the one or more symbols that have been configured for the downlink transmissions.

24. The apparatus of claim 22, wherein the instructions are further executable by the at least one processor to cause the apparatus to:
determine, for a first repetition of the one or more repetitions, that the first repetition crosses a slot boundary; and
split the first repetition to generate the repetition associated with the identified second quantity of symbols, and zero or more additional repetitions.

25. The apparatus of claim 22, wherein the instructions are further executable by the at least one processor to cause the apparatus to:
receive, from the base station, an indication for the UE to use one of a plurality of uplink control channel repetition types; and
determine the quantity of resource blocks further based at least in part on the received indication.

26. The apparatus of claim 22, wherein the instructions are further executable by the at least one processor to cause the apparatus to:
determine a quantity of demodulation reference signal symbols associated with the first quantity of symbols, wherein the determining the quantity of resource blocks is further based at least in part on the determined quantity of demodulation reference signal symbols.

27. The apparatus of claim 26, wherein determining the quantity of demodulation reference signal symbols is based at least in part on an assumption of an absence of the configuration to perform intra-repetition hopping.

28. The apparatus of claim 22, wherein the instructions are further executable by the at least one processor to cause the apparatus to:
determine, from a plurality of sets of uplink control channel resources, a set of uplink control channel resources on which to transmit the uplink control channel transmission, wherein the quantity of resource blocks for the repetition is based at least in part on the determined set of uplink control channel resources.

29. The apparatus of claim 22, wherein the instructions are further executable by the at least one processor to cause the apparatus to:
determine, from a plurality of uplink control channel formats, an uplink control channel format to use to transmit the uplink control channel transmission, wherein the quantity of resource blocks for the repetition is based at least in part on the determined uplink control channel format.

30. An apparatus for wireless communications at a base station, comprising:
- at least one processor,
- memory coupled with the at least one processor; and
- instructions stored in the memory and executable by the at least one processor to cause the apparatus to:
  - identify a configuration for one or more repetitions of an uplink control channel transmission to be transmitted by a user equipment (UE), the configuration indicating a first quantity of repetitions of the one or more repetitions, and each repetition of the one or more repetitions comprising a first quantity of symbols indicated by the configuration;
  - determine a quantity of resource blocks for each repetition of the one or more repetitions based at least in part on the first quantity of symbols;
  - identify that a second quantity of symbols available to the UE to transmit a repetition of the one or more repetitions is less than the first quantity of symbols;
  - determine, for the repetition on the second quantity of symbols, to use the quantity of resource blocks determined based at least in part on the first quantity of symbols for the repetition on the second quantity of symbols; and
  - receive, from the UE, the repetition on the second quantity of symbols on the quantity of resource blocks.

* * * * *